United States Patent
Tanaka et al.

(10) Patent No.: US 8,299,674 B2
(45) Date of Patent: Oct. 30, 2012

(54) ELECTRIC ROTATING MACHINE DRIVABLE WITH A SINGLE THREE-PHASE INVERTER

(75) Inventors: Asuka Tanaka, Kariya (JP); Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 187 days.

(21) Appl. No.: 12/861,412

(22) Filed: Aug. 23, 2010

(65) Prior Publication Data

US 2011/0043069 A1    Feb. 24, 2011

(30) Foreign Application Priority Data

Aug. 21, 2009    (JP) ................................. 2009-191945

(51) Int. Cl.
*H02K 3/00* (2006.01)

(52) U.S. Cl. ......... 310/184; 310/179; 310/180; 310/198

(58) Field of Classification Search ................. 310/179, 310/180, 184, 198; *H02K 3/28*
See application file for complete search history.

(56) References Cited

U.S. PATENT DOCUMENTS

| | | | |
|---|---|---|---|
| 4,710,661 A * | 12/1987 | Gjota | 310/198 |
| 6,011,332 A | 1/2000 | Umeda et al. | |
| 6,784,583 B2 * | 8/2004 | Umeda | 310/179 |
| 6,998,750 B2 * | 2/2006 | Anma et al. | 310/198 |
| 7,291,954 B2 * | 11/2007 | Kashihara et al. | 310/184 |
| 7,554,238 B2 * | 6/2009 | Miyashita et al. | 310/184 |

FOREIGN PATENT DOCUMENTS

| | | |
|---|---|---|
| JP | A-10-225181 | 8/1998 |
| JP | A-11-075334 | 3/1999 |
| JP | A-2008-005603 | 1/2008 |

OTHER PUBLICATIONS

U.S. Appl. No. 12/780,125, filed May 14, 2010 in the name of Taniguchi et al.

* cited by examiner

*Primary Examiner* — Quyen Leung
*Assistant Examiner* — Thomas Truong
(74) *Attorney, Agent, or Firm* — Oliff & Berridge, PLC

(57) ABSTRACT

In an electric rotating machine, a stator coil is comprised of first and second winding groups. The stator coil is wound around a stator core in a concentrated winding manner so that the phase difference in electrical angle between each corresponding pair of windings of the first and second winding groups is equal to $\pi/6$. Further, the windings of the first and second winding groups are connected to form $\Delta$-Y connections. Consequently, the sixth harmonic components of the electromagnetic forces created by the windings of the first winding group can be offset by those of the electromagnetic forces created the windings of the second winding group. As a result, the total magnetic noise and torque ripple generated in the machine can be reduced. Moreover, the machine can be driven with only a single three-phase inverter to achieve the effects of reducing the total magnetic noise and torque ripple.

10 Claims, 8 Drawing Sheets

ELECTRIC ROTATING MACHINE DRIVABLE WITH A SINGLE THREE-PHASE INVERTER

CROSS-REFERENCE TO RELATED APPLICATION

This application is based on and claims priority from Japanese Patent Application No. 2009-191945, filed on Aug. 21, 2009, the content of which is hereby incorporated by reference in its entirety into this application.

BACKGROUND OF THE INVENTION

1. Technical Field of the Invention

The present invention relates generally to electric rotating machines that include a multi-phase stator coil. More particularly, the invention relates to an electric rotating machine that has an improved stator coil arrangement for reducing magnetic noise and torque ripple and is drivable with only a single three-phase inverter.

2. Description of the Related Art

A conventional three-phase electric rotating machine includes a stator and a rotor. The stator includes a hollow cylindrical stator core and a three-phase stator coil wound around the stator core. The rotor has a plurality of magnetic poles formed by permanent magnets. The magnetic poles are so arranged that the polarities thereof alternate between north and south in the circumferential direction of the stator core.

In such an electric rotating machine, magnetic noise and torque ripple are generally caused by the overlapping of harmonic components with sine-wave drive currents supplied to the phase windings of the stator coil. Further, in terms of magnetic flux, the main cause of magnetic noise and torque ripple is the third harmonic component of magnetic flux. Moreover, electromagnetic force is proportional to the square of magnetic flux. Therefore, in terms of electromagnetic force, the main cause of magnetic noise and torque ripple is the sixth harmonic component of electromagnetic force.

Japanese Patent Application Publication No. 2008-5603 discloses a synchronous machine in which: the stator coil is comprised of first and second winding groups; and the ratio of the number of magnetic poles of the rotor to the number of slots of the stator is equal to 10:12 or 14:12. The first winding group includes a plurality of windings each of which corresponds to one of U, V, and W phases. The windings of the first winding group are Δ-connected. On the other hand, the second winding group includes a plurality of windings each of which corresponds to one of X, Y, and Z phases. The windings of the second winding group are also Δ-connected. Further, the first and second winding groups are wound around the stator core in a concentrated winding manner so that: the windings of the first winding group are alternately arranged with those of the second winding group in the circumferential direction of the stator core; and each circumferentially-adjacent pair of one of the windings of the first winding group and one of the windings of the second winding group are wound in opposite directions. Consequently, the phase difference in electrical angle between each circumferentially-adjacent pair of one of the windings of the first winding group and one of the windings of the second winding group is equal to π/6. Moreover, the phase difference of π/6 is equal to half the wavelength (i.e., π/3) of the sixth harmonic components of the electromagnetic forces created by the windings of the first and second winding groups. Therefore, the sixth harmonic components of the electromagnetic forces created by the windings of the first winding group can be offset by those of the electromagnetic forces created by the windings of the second winding group. As a result, when the synchronous machine is used in a mechanical power generation system to function as an electric motor, the total magnetic noise and torque ripple generated in the synchronous machine can be reduced.

However, with the stator coil arrangement disclosed in the above patent document, it is necessary to employ two three-phase inverters to supply first and second three-phase AC currents, which are different in phase by π/6, respectively to the Δ-connected windings of the first winding group and the Δ-connected windings of the second winding group. Consequently, with the use of the two three-phase inverters, the scale, cost, and complexity of the entire mechanical power generation system will be increased.

SUMMARY OF THE INVENTION

It is a primary object of the present invention to solve the above-described problems with the prior art.

According to the present invention, there is provided a first electric rotating machine which includes a stator and a rotor. The stator includes a hollow cylindrical stator core and a stator coil. The stator core has a plurality of stator core teeth that are formed at a predetermined pitch in the circumferential direction of the stator core. The stator coil has three terminals via which three-phase AC current is input to or output from the stator coil. The rotor is disposed radially inside of the stator core. The rotor has a plurality of magnetic poles the polarities of which alternate between north and south in the circumferential direction of the stator core. The number of the stator core teeth is equal to 12×n, and the number of the magnetic poles of the rotor is equal to 10×n or 14×n, where n is a natural number. The stator coil is comprised of first and second winding groups. The first winding group includes 2×n X-phase windings, 2×n Y-phase windings, and 2×n Z-phase windings. The second winding group includes 2×n U-phase windings, 2×n V-phase windings, and 2×n W-phase windings. The stator coil is wound around the stator core in a concentrated winding manner so that each of the windings of the first and second winding groups is wound around a corresponding one of the stator core teeth. The windings of the first and second winding groups are connected to form 2×n Δ-Y connections that are arranged one after another in the circumferential direction of the stator core. Each of the Δ-Y connections is formed of six different-phase windings including one X-phase winding, one Y-phase winding, and one Z-phase winding of the first winding group and one U-phase winding, one V-phase winding, and one W-phase winding of the second winding group. The six different-phase windings are adjacent to one another and arranged in a phase sequence of U, X, V, Y, W, and Z in the circumferential direction of the stator core. For each of the Δ-Y connections, the U-phase and X-phase windings are wound in opposite directions; the V-phase and Y-phase windings are wound in opposite directions; and the W-phase and Z-phase windings are wound in opposite directions. Each of the Δ-Y connections is a combination of a Δ connection and a Y connection. The Δ connection is formed by Δ-connecting the three different-phase windings of one of the first and second winding groups. The Y connection is formed by Y-connecting the three different-phase windings of the other winding group. The Δ and Y connections are combined by connecting opposite ends of each of the Y-connected windings respectively to a corresponding one of nodes between the Δ-connected windings and a corresponding one of the three terminals of the stator coil.

With the above configuration, the sixth harmonic components of the electromagnetic forces created by the windings of the first winding group can be offset by those of the electromagnetic forces created by the windings of the second winding group. As a result, when the first electric rotating machine is used in a mechanical power generation system to function as an electric motor, the total magnetic noise and torque ripple generated in the first electric rotating machine can be reduced. Moreover, unlike the synchronous machine disclosed in Japanese Patent Application Publication No. 2008-5603, the first electric rotating machine can be driven with only a single three-phase inverter to achieve the above-described effects of reducing the total magnetic noise and torque ripple. Consequently, with the use of the single three-phase inverter, reductions in the scale, cost, and complexity of the entire mechanical power generation system can be achieved.

According to the present invention, there is also provided a second electric rotating machine which includes a stator and a rotor. The stator includes a hollow cylindrical stator core and a stator coil. The stator core has a plurality of stator core teeth that are formed at a predetermined pitch in the circumferential direction of the stator core. The stator coil has three terminals via which three-phase AC current is input to or output from the stator coil. The rotor is disposed radially inside of the stator core. The rotor has a plurality of magnetic poles the polarities of which alternate between north and south in the circumferential direction of the stator core. The number of the stator core teeth is equal to 12×n, and the number of the magnetic poles of the rotor is equal to 10×n or 14×n, where n is a natural number. The stator coil is comprised of first and second winding groups. The first winding group includes 2×n X-phase windings, 2×n Y-phase windings, and 2×n Z-phase windings. The second winding group includes 2×n U-phase windings, 2×n V-phase windings, and 2×n W-phase windings. Each of the windings of the first and second winding groups includes a first section and a second section. The stator coil is wound around the stator core in a concentrated winding manner so that each of the first and second sections of the windings of the first and second winding groups is wound around a corresponding one of the stator core teeth. For each of the windings of the first and second winding groups, the first and second sections of the winding are wound in opposite directions. The windings of the first and second winding groups are connected to form 2×n Δ-Y connections that are arranged one after another in the circumferential direction of the stator core. Each of the Δ-Y connections is formed of six different-phase windings including one X-phase winding, one Y-phase winding, and one Z-phase winding of the first winding group and one U-phase winding, one V-phase winding, and one W-phase winding of the second winding group. For each of the Δ-Y connections: (1) the first and second sections of the three different-phase windings of the first winding group are arranged in the circumferential direction of the stator core in a sequence of the first section of the X-phase winding, the second section of the X-phase winding, the first section of the Y-phase winding, the second section of the Y-phase winding, the first section of the Z-phase winding, and the second section of the Z-phase winding; (2) the first and second sections of the three different-phase windings of the second winding group are arranged in the circumferential direction of the stator core in a sequence of the first section of the U-phase winding, the second section of the U-phase winding, the first section of the V-phase winding, the second section of the V-phase winding, the first section of the W-phase winding, and the second section of the W-phase winding; (3) the first section of the U-phase winding and the second section of the X-phase winding are wound around the same stator core tooth, the second section of the U-phase winding and the first section of the Y-phase winding are wound around the same stator core tooth, the first section of the V-phase winding and the second section of the Y-phase winding are wound around the same stator core tooth, the second section of the V-phase winding and the first section of the Z-phase winding are wound around the same stator core tooth, and the first section of the W-phase winding and the second section of the Z-phase winding are wound around the same stator core tooth; and (4) the first sections of the U-phase and X-phase windings are wound in opposite directions, the second sections of the U-phase and X-phase windings are wound in opposite directions, the first sections of the V-phase and Y-phase windings are wound in opposite directions, the second sections of the V-phase and Y-phase windings are wound in opposite directions, the first sections of the W-phase and Z-phase windings are wound in opposite directions, the second sections of the W-phase and Z-phase windings are wound in opposite directions. Moreover, each of the Δ-Y connections is a combination of a Δ connection and a Y connection. The Δ connection is formed by Δ-connecting the three different-phase windings of one of the first and second winding groups. The Y connection is formed by Y-connecting the three different-phase windings of the other winding group. The Δ and Y connections are combined by connecting opposite ends of each of the Y-connected windings respectively to a corresponding one of nodes between the Δ-connected windings and a corresponding one of the three terminals of the stator coil.

The second electric rotating machine has the same advantages as the first electric rotating machine. In addition, in the second electric rotating machine, each corresponding pair of the windings of the first and second winding groups occupies an angular range covering three stator core teeth. Consequently, the sixth harmonic components of the electromagnetic forces caused by the corresponding pair of the windings can be offset in a wider angular range. As a result, it is possible to more effectively reduce the total magnetic noise and torque ripple generated in the second electric rotating machine.

According to the present invention, there is also provided a third electric rotating machine which includes a stator and a rotor. The stator includes a hollow cylindrical stator core and a stator coil. The stator core has a plurality of stator core teeth that are formed at a predetermined pitch in the circumferential direction of the stator core. The stator coil has three terminals via which three-phase AC current is input to or output from the stator coil. The rotor is disposed radially inside of the stator core. The rotor has a plurality of magnetic poles the polarities of which alternate between north and south in the circumferential direction of the stator core. The number of the stator core teeth is equal to 12×n, and the number of the magnetic poles of the rotor is equal to 10×n or 14×n, where n is a natural number. The stator coil is comprised of first and second winding groups. The first winding group includes 2×n X-phase windings, 2×n Y-phase windings, and 2×n Z-phase windings. The second winding group includes 2×n U-phase windings, 2×n V-phase windings, and 2×n W-phase windings. The stator coil is wound around the stator core in a concentrated winding manner so that each of the windings of the first and second winding groups is wound around a corresponding one of the stator core teeth. The windings of the first and second winding groups are connected to form 2×n Δ-Y connections that are arranged one after another in the circumferential direction of the stator core. Each of the Δ-Y connections is formed of six different-phase windings including one X-phase winding, one Y-phase winding, and one Z-phase winding of the first winding group and one U-phase winding, one V-phase winding, and one W-phase winding of the second winding group. The six different-phase windings are adjacent to one another and arranged in a phase sequence of U, X, V, Y, W, and Z in the circumferential direction of the stator core. For each of the Δ-Y connections, the U-phase and X-phase windings are wound in opposite directions; the V-phase and Y-phase windings are wound in opposite directions; and the W-phase and Z-phase windings are wound in opposite directions. Each of the Δ-Y connections is a combination of a Δ connection and a Y connection. The Δ connection is formed by Δ-connecting the three different-phase windings of one of the first and second winding groups. Nodes between the Δ-connected windings are respectively connected to the three terminals of the stator coil. The Y connection is formed by Y-connecting the three different-phase windings of the other winding group to define a neutral point therebetween. The Δ and Y connections are combined by connecting ends of the Y-connected windings opposite to the neutral point respectively to the nodes between the Δ-connected windings.

The third electric rotating machine has the same advantages as the first electric rotating machine.

According to the present invention, there is also provided a fourth electric rotating machine which includes a stator and a rotor. The stator includes a hollow cylindrical stator core and a stator coil. The stator core has a plurality of stator core teeth that are formed at a predetermined pitch in the circumferential direction of the stator core. The stator coil has three terminals via which three-phase AC current is input to or output from the stator coil. The rotor is disposed radially inside of the stator core. The rotor has a plurality of magnetic poles the polarities of which alternate between north and south in the circumferential direction of the stator core. The number of the stator core teeth is equal to 12×n, and the number of the magnetic poles of the rotor is equal to 10×n or 14×n, where n is a natural number. The stator coil is comprised of first and second winding groups. The first winding group includes 2×n X-phase windings, 2×n Y-phase windings, and 2×n Z-phase windings. The second winding group includes 2×n U-phase windings, 2×n V-phase windings, and 2×n W-phase windings. Each of the windings of the first and second winding groups includes a first section and a second section. The stator coil is wound around the stator core in a concentrated winding manner so that each of the first and second sections of the windings of the first and second winding groups is wound around a corresponding one of the stator core teeth. For each of the windings of the first and second winding groups, the first and second sections of the winding are wound in opposite directions. The windings of the first and second winding groups are connected to form 2×n Δ-Y connections that are arranged one after another in the circumferential direction of the stator core. Each of the Δ-Y connections is formed of six different-phase windings including one X-phase winding, one Y-phase winding, and one Z-phase winding of the first winding group and one U-phase winding, one V-phase winding, and one W-phase winding of the second winding group. For each of the Δ-Y connections: (1) the first and second sections of the three different-phase windings of the first winding group are arranged in the circumferential direction of the stator core in a sequence of the first section of the X-phase winding, the second section of the X-phase winding, the first section of the Y-phase winding, the second section of the Y-phase winding, the first section of the Z-phase winding, and the second section of the Z-phase winding; (2) the first and second sections of the three different-phase windings of the second winding group are arranged in the circumferential direction of the stator core in a sequence of the first section of the U-phase winding, the second section of the U-phase winding, the first section of the V-phase winding, the second section of the V-phase winding, the first section of the W-phase winding, and the second section of the W-phase winding; (3) the first section of the U-phase winding and the second section of the X-phase winding are wound around the same stator core tooth, the second section of the U-phase winding and the first section of the Y-phase winding are wound around the same stator core tooth, the first section of the V-phase winding and the second section of the Y-phase winding are wound around the same stator core tooth, the second section of the V-phase winding and the first section of the Z-phase winding are wound around the same stator core tooth, and the first section of the W-phase winding and the second section of the Z-phase winding are wound around the same stator core tooth; and (4) the first sections of the U-phase and X-phase windings are wound in opposite directions, the second sections of the U-phase and X-phase windings are wound in opposite directions, the first sections of the V-phase and Y-phase windings are wound in opposite directions, the second sections of the V-phase and Y-phase windings are wound in opposite directions, the first sections of the W-phase and Z-phase windings are wound in opposite directions, the second sections of the W-phase and Z-phase windings are wound in opposite directions. Moreover, each of the Δ-Y connections is a combination of a Δ connection and a Y connection. The Δ connection is formed by Δ-connecting the three different-phase windings of one of the first and second winding groups. Nodes between the Δ-connected windings are respectively connected to the three terminals of the stator coil. The Y connection is formed by Y-connecting the three different-phase windings of the other winding group to define a neutral point therebetween. The Δ and Y connections are combined by connecting ends of the Y-connected windings opposite to the neutral point respectively to the nodes between the Δ-connected windings.

The fourth electric rotating machine has the same advantages as the second electric rotating machine.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
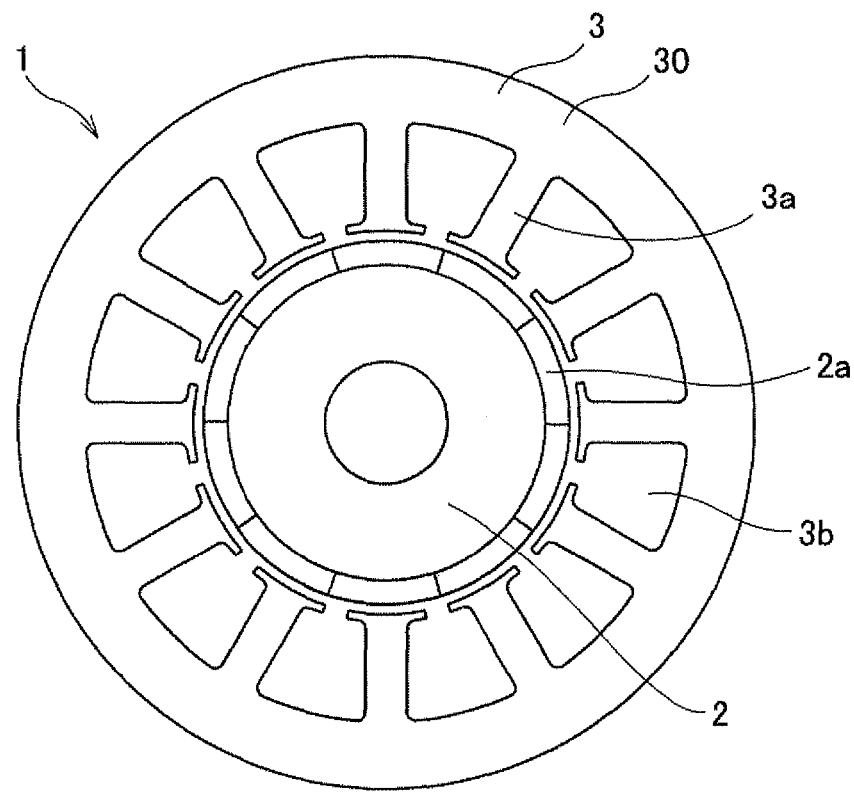
FIG. 1 is a schematic view showing the overall configuration of an electric rotating machine according to the first embodiment of the invention.

Preferred embodiments of the present invention will be described hereinafter with reference to FIGS. 1-12. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

First Embodiment

FIG. 1 shows the overall configuration of an electric rotating machine 1 according to the first embodiment of the invention. As shown in the figure, the electric rotating machine 1 includes a rotor 2 and a stator 3.

Figure 2:
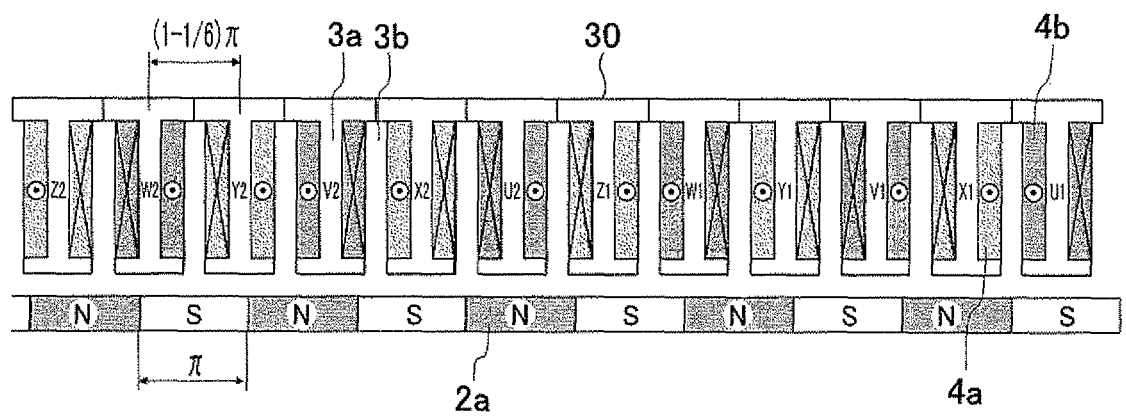
FIG. 2 is a development of an axial cross section of the electric rotating machine according to the first embodiment.

Referring further to FIG. 2 together with FIG. 1, the stator 3 includes a hollow cylindrical stator core 30 and a stator coil 4 wound around the stator core 30. The stator core 30 has twelve stator core teeth 3a that are formed to protrude radially inward and arranged in the circumferential direction of the stator core 30 at a predetermined pitch. Between each circumferentially-adjacent pair of the stator core teeth 3a, there is formed a slot 3b. That is, the stator core 30 has twelve slots 3b formed between the stator core teeth 3a. The stator coil 4 is comprised of first and second winding groups 4a and 4b.

The rotor 2 is rotatably disposed radially inside of the stator core 30. The rotor 2 has ten magnetic poles 2a that are formed, for example by permanent magnets, on a radially outer periphery of the rotor 2 to face a radially inner periphery of the stator 3. Further, the ten magnetic poles 2a include five N (North) poles and five S (South) poles that are alternately arranged in the circumferential direction of the rotor 2 (or in the circumferential direction of the stator core 30).

In the present embodiment, with respect to the number of the magnetic poles 2a being equal to ten, the number of the stator core teeth 3a is equal to twelve. Therefore, with respect to the pitch of the magnetic poles 2a in electrical angle being equal to $\pi$, the pitch of the stator core teeth 3a in electrical angle is equal to $(1-\frac{1}{6})\pi$.

Figure 3:
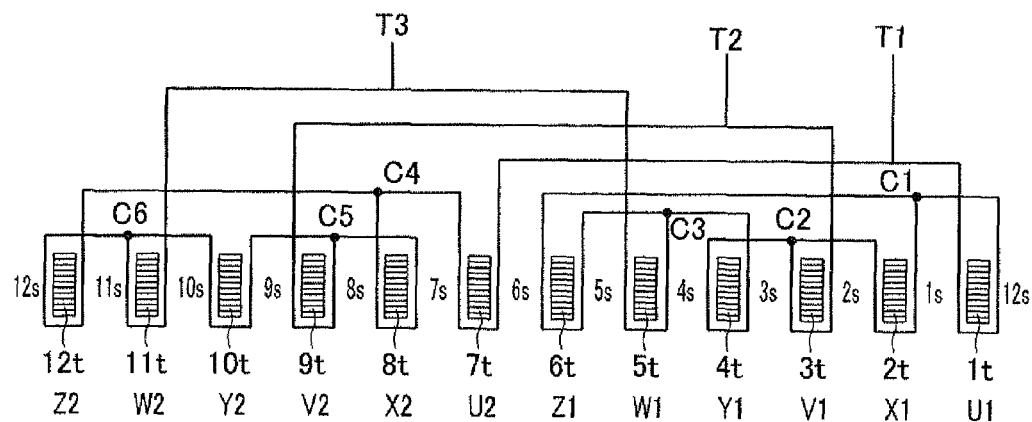
FIG. 3 is a schematic winding connection diagram of the electric rotating machine according to the first embodiment.

Referring now to FIG. 3, the first winding group 4a includes two X-phase windings, two Y-phase windings, and two Z-phase windings. On the other hand, the second winding group 4b includes two U-phase windings, two V-phase windings, and two W-phase windings. In addition, for the sake of convenience of explanation, in FIG. 3, the twelve stator core teeth 3a of the stator core 30 are sequentially numbered with numerals 1t-12t; the twelve slots 3b of the stator core 30 are sequentially numbered with numerals 1s-12s.

In the present embodiment, the stator coil 4 is wound around the stator core 30 in a concentrated winding manner so that each of the windings of the first and second winding groups 4a and 4b is wound around a corresponding one of the stator core teeth 3a of the stator core 30.

Specifically, the windings of the first winding group 4a are wound as follows.

The first X-phase winding X1 is wound, from the slot 1s to the slot 2s, clockwise around the stator core tooth 2t by a first predetermined number of turns. The first Y-phase winding Y1 is wound, from the slot 4s to the slot 3s, counterclockwise around the stator core tooth 4t by the first predetermined number of turns. The first Z-phase winding Z1 is wound, from the slot 5s to the slot 6s, clockwise around the stator core tooth 6t by the first predetermined number of turns. Further, the first X-phase winding X1, the first Y-phase winding Y1, and the first Z-phase winding Z1 are Δ-connected so that: the first X-phase winding X1 and the first Y-phase winding Y1 are connected at a node C2; the first Y-phase winding Y1 and the first Z-phase winding Z1 are connected at a node C3; and the first Z-phase winding Z1 and the first X-phase winding X1 are connected at a node C1.

Moreover, the second X-phase winding X2 is wound, from the slot 8s to the slot 7s, counterclockwise around the stator core tooth 8t by the first predetermined number of turns. The second Y-phase winding Y2 is wound, from the slot 9s to the slot 10s, clockwise around the stator core tooth 10t by the first predetermined number of turns. The second Z-phase winding Z2 is wound, from the slot 12s to the slot 11s, counterclockwise around the stator core tooth 12t by the first predetermined number of turns. Further, the second X-phase winding X2, the second Y-phase winding Y2, and the second Z-phase winding Z2 are Δ-connected so that: the second X-phase winding X2 and the second Y-phase winding Y2 are connected at a node C5; the second Y-phase winding Y2 and the second Z-phase winding Z2 are connected at a node C6; and the second Z-phase winding Z2 and the second X-phase winding X2 are connected at a node C4.

On the other hand, the windings of the second winding group 4b are wound as follows.

The first U-phase winding U1 is wound, from the slot 1s to the slot 12s, counterclockwise around the stator core tooth 1t by a second predetermined number of turns. Further, the first U-phase winding U1 has one end protruding from the slot 1s and connected to a first terminal T1 of the stator coil 4, and the other end protruding from the slot 12s and connected to the node C1. The first V-phase winding V1 is wound, from the slot 2s to the slot 3s, clockwise around the stator core tooth 3t by the second predetermined number of turns. Further, the first V-phase winding V1 has one end protruding from the slot 2s and connected to a second terminal T2 of the stator coil 4, and the other end protruding from the slot 3s and connected to the node C2. The first W-phase winding W1 is wound, from the slot 5s to the slot 4s, counterclockwise around the stator core tooth 5t by the second predetermined number of turns. Further, the first W-phase winding W1 has one end protruding from the slot 5s and connected to a third terminal T3 of the stator coil 4, and the other end protruding from the slot 4s and connected to the node C3. As a result, the first U-phase winding U1, the first V-phase winding V1, and the first W-phase winding W1 are Y-connected with the neutral point therebetween being made up of the Δ connection of the first X-phase winding X1, the first Y-phase winding Y1, and the first Z-phase winding Z1 (see FIG. 4).

Moreover, the second U-phase winding U2 is wound, from the slot 6s to the slot 7s, clockwise around the stator core tooth 7t by the second predetermined number of turns. Further, the second U-phase winding U2 has one end protruding from the slot 6s and connected to the first terminal T1 of the stator coil 4, and the other end protruding from the slot 7s and connected to the node C4. The second V-phase winding V2 is wound, from the slot 9s to the slot 8s, counterclockwise around the stator core tooth 9t by the second predetermined number of turns. Further, the second V-phase winding V2 has one end protruding from the slot 9s and connected to the second terminal T2 of the stator coil 4, and the other end protruding from the slot 8s and connected to the node C5. The second W-phase winding W2 is wound, from the slot 10s to the slot 11s, clockwise around the stator core tooth 11t by the second predetermined number of turns. Further, the second W-phase winding W2 has one end protruding from the slot 10s and connected to the third terminal T3 of the stator coil 4, and the other end protruding from the slot 11s and connected to the node C6. As a result, the second U-phase winding U2, the second V-phase winding V2, and the second W-phase winding W2 are Y-connected with the neutral point therebetween being made up of the Δ connection of the second X-phase winding X2, the second Y-phase winding Y2, and the second Z-phase winding Z2 (see FIG. 4).

Accordingly, in the present embodiment, the stator coil 4 is comprised of two Δ-Y connections. The first Δ-Y connection is formed by combining the Δ connection of the first X-phase winding X1, the first Y-phase winding Y1, and the first Z-phase winding Z1 with the Y connection of the first U-phase winding U1, the first V-phase winding V1, and the first W-phase winding W1. The second Δ-Y connection is formed by combining the Δ connection of the second X-phase winding X2, the second Y-phase winding Y2, and the second Z-phase winding Z2 with the Y connection of the second U-phase winding U2, the second V-phase winding V2, and the second W-phase winding W2. It should be noted that: hereinafter, a Δ-Y connection denotes a Δ-Y-connected winding assembly; a Δ connection denotes a Δ-connected winding assembly; and a Y connection denotes a Y-connected winding assembly.

Moreover, in the present embodiment, the first predetermined number of turns, by which each of the Δ-connected windings of the first winding group 4a is wound, is set to be 1.6 to 1.9 times the second predetermined number of turns by which each of the Y-connected windings of the second winding group 4b is wound.

Figure 4:
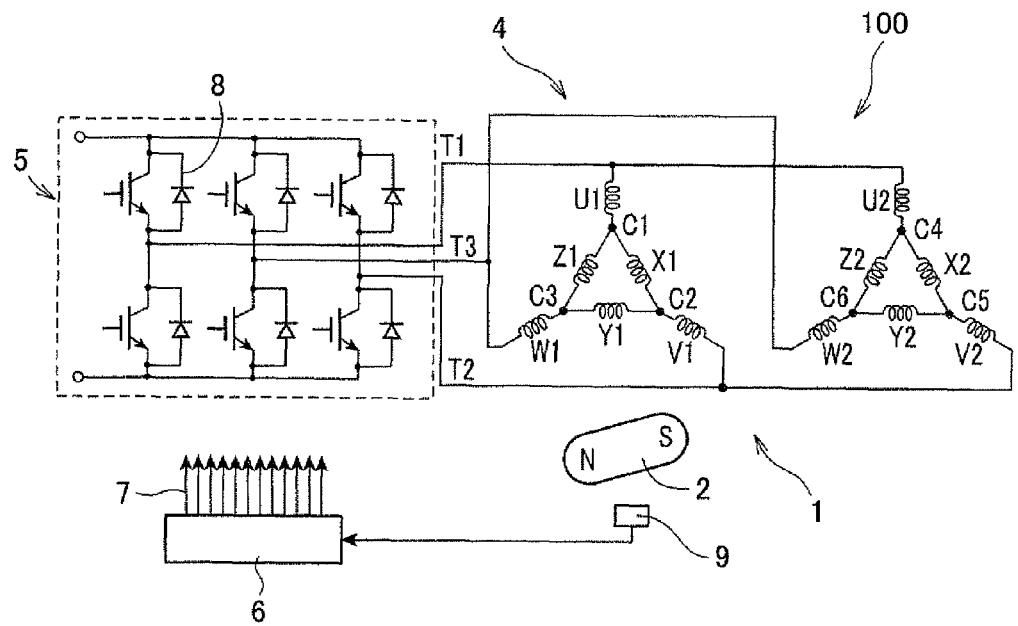
FIG. 4 is a schematic view illustrating the overall configuration of a mechanical power generation system which includes the electric rotating machine according to the first embodiment.

FIG. 4 shows the overall configuration of a mechanical power generation system 100 in which the electric rotating machine 1 according to the present embodiment is used to function as an electric motor. In addition, the electric circuit of the stator 3 of the electric rotating machine 1 is also shown in FIG. 4.

The mechanical power generation system 100 includes, in addition to the electric rotating machine 1, a three-phase inverter 5, a controller 6, and an angular position sensor 9.

The inverter 5 is electrically connected to the terminals T1-T3 of the stator coil 4 of the electric rotating machine 1 to supply three-phase AC current to the stator coil 4. The inverter 5 is of a well-known type; therefore a detailed description of its configuration is omitted hereinafter. The inverter 5 drives the electric rotating machine 1 using a well-known sine-wave PWM driving method.

More specifically, the inverter 5 is configured with six power transistors 8. The power transistors 8 are respectively driven by six drive signals 7 sent from the controller 6, thereby supplying substantially sine-wave, three-phase AC current to the stator coil 4. The angular position sensor 9 is configured with, for example, a resolver and mounted to the rotor 2 of the electric rotating machine 1. The angular position sensor 9 senses the angular position of the rotor 2 and outputs to the controller 6 an angular position signal that indicates the sensed angular position. The controller 6 generates, based on the angular position signal, the drive signals 7 and sends them to the power transistors 8 of the inverter 5. In addition, it is also possible for the controller 6 to feedback-control the inverter 5 based on the AC current actually supplied to the stator coil 4 which is sensed by a current sensor (not shown).

According to the present embodiment, it is possible to achieve the following advantages.

As described previously, in a conventional three-phase electric rotating machine, magnetic noise and torque ripple are generally caused by the overlapping of harmonic components with sine-wave drive currents supplied to the phase windings of a three-phase stator coil of the machine; the harmonic components are caused by, for example, a dead time provided for protecting a power transistor of a three-phase inverter that drives the electric rotating machine. More specifically, in terms of electromagnetic force, the magnetic noise and torque ripple are mainly caused by the sixth harmonic components of electromagnetic forces created by the phase windings of the three-phase stator coil. In addition, the wavelength of the sixth-order harmonic components is equal to $\pi/3$.

In comparison, in the electric rotating machine 1 according to the present embodiment, with respect to the number of the magnetic poles 2a being equal to ten (i.e., 10×1), the number of the stator core teeth 3a is equal to twelve (i.e., 12×1). Therefore, with respect to the pitch of the magnetic poles 2a in electrical angle being equal to n, the pitch of the stator core teeth 3a in electrical angle is equal to $(1-\frac{1}{6})\pi$. Further, the stator coil 4 is comprised of the first and second winding groups 4a and 4b. The first winding group 4a includes the first and second X-phase windings X1 and X2 (i.e., 2×1 X-phase windings), the first and second Y-phase windings Y1 and Y2 (i.e., 2×1 Y-phase windings), and the first and second Z-phase windings Z1 and Z2 (i.e., 2×1 Z-phase windings). The second winding group 4b includes the first and second U-phase windings U1 and U2 (i.e., 2×1 U-phase windings), the first and second V-phase windings V1 and V2 (i.e., 2×1 V-phase windings), and the first and second W-phase windings W1 and W2 (i.e., 2×1 W-phase windings). The stator coil 4 is wound around the stator core 30 in a concentrated winding manner so that each of the windings of the first and second winding groups 4a and 4b is wound around a corresponding one of the stator core teeth 3a. Moreover, the X-phase, Y-phase, and Z-phase windings of the first winding group 4a are respectively wound around the even-numbered stator core teeth 3a, whereas the U-phase, V-phase, and W-phase windings of the second winding group 4b are respectively wound around the odd-numbered stator core teeth 3a. That is, the windings of the first winding group 4a are alternately arranged with those of the second winding group 4b in the circumferential direction of the stator core 30. Furthermore, the winding directions of each corresponding pair of one of the X-phase, Y-phase, and Z-phase windings of the first stator coil 4a and one of the U-phase, V-phase, and W-phase windings of the second stator coil 4b, which are respectively wound around an adjacent pair of the stator core teeth 3a, are opposite to each other. Consequently, the phase difference between each corresponding pair of the windings of the first and second stator coils 4a and 4b, such as the pairs of the windings X1 and U1, Y1 and V1, Z1 and W1, X2 and U2, Y2 and V2, and Z2 and W2, becomes equal to: $(1-\frac{1}{6})\pi - \pi = -\pi/6$.

Furthermore, in the present embodiment, the windings of the first and second winding groups 4a and 4b are connected to form two (i.e., 2×1)Δ-Y connections that are arranged one after another in the circumferential direction of the stator core 30. The first Δ-Y connection is formed of the windings X1, Y1, and Z1 of the first winding group 4a and the windings U1, V1, and W1 of the second winding group 4b; the six different-phase windings are adjacent to one another and arranged in the sequence U1, X1, V1, Y1, W1, and Z1 in the circumferential direction of the stator core 30. The first Δ-Y connection is a combination of the first Δ connection of the windings X1, Y1, and Z1 of the first winding group 4a and the first Y-connection of the windings U1, V1, and W1 of the second winding group 4b. The first Δ connection and the first Y connection are combined by connecting opposite ends of each of the Y-connected windings U1, V1, and W1 respectively to a corresponding one of the nodes C1-C3 between the Δ-connected windings X1, Y1, and Z1 and a corresponding one of the terminals T1-T3 of the stator coil 4. On the other hand, the second Δ-Y connection is formed of the windings X2, Y2, and Z2 of the first winding group 4a and the windings U2, V2, and W2 of the second winding group 4b; the six different-phase windings are adjacent to one another and arranged in the sequence U2, X2, V2, Y2, W2, and Z2 in the circumferential direction of the stator core 30. The second Δ-Y connection is a combination of the second Δ connection of the windings X2, Y2, and Z2 of the first winding group 4a and the second Y connection of the windings U2, V2, and W2 of the second winding group 4b. The second Δ connection and the second Y connection are combined by connecting opposite ends of each of the Y-connected windings U2, V2, and W2 respectively to a corresponding one of the nodes C4-C6 between the Δ-connected windings X2, Y2, and Z2 and a corresponding one of the terminals T1-T3 of the stator coil 4.

Figure 5:
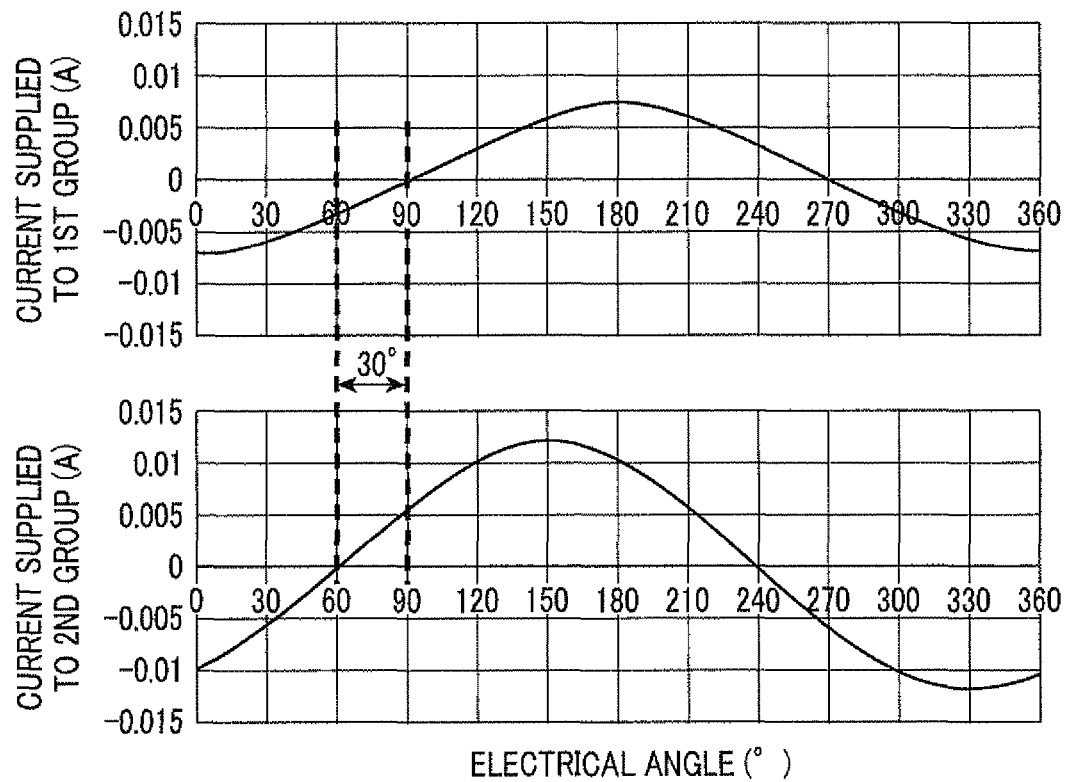
FIG. 5 is a waveform chart illustrating the waveforms of drive currents respectively supplied to a corresponding pair of windings of first and second winding groups that form a stator coil of the electric rotating machine.
Figure 6:
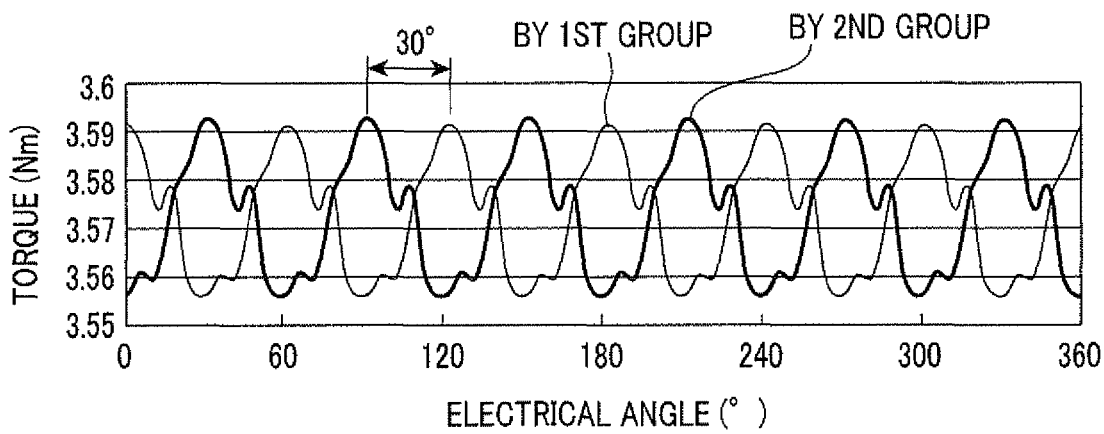
FIG. 6 is a waveform chart illustrating the offsetting of the six harmonic component of torque caused by the first winding group by that caused by the second winding group.
Figure 7:
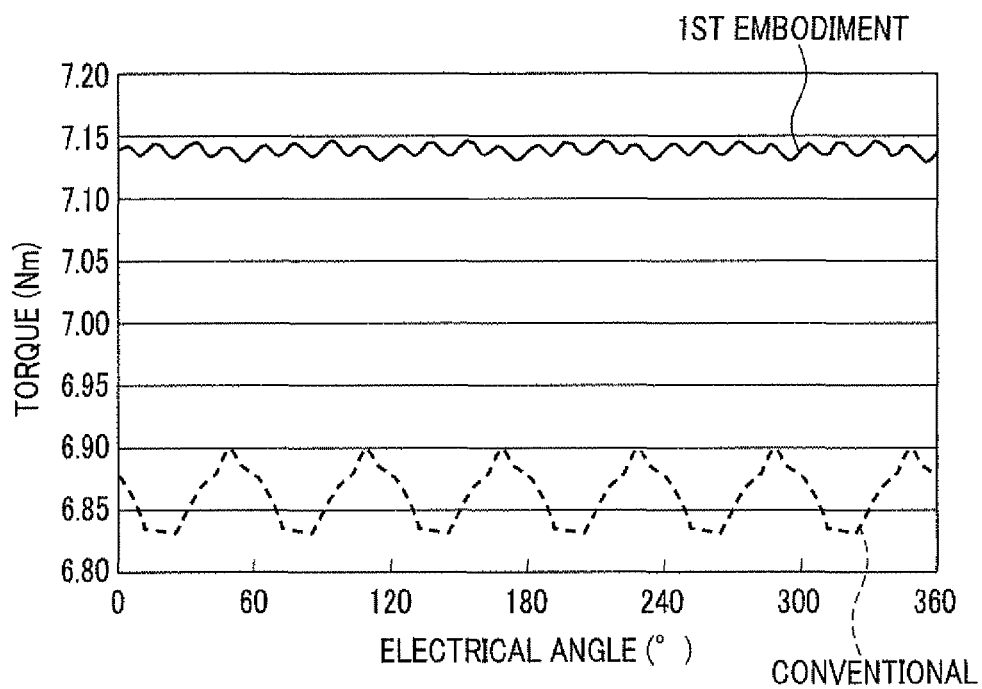
FIG. 7 is a waveform chart illustrating both the waveform of torque generated by the electric rotating machine according to the first embodiment and the waveform of torque generated by a conventional electric rotating machine.

With the above arrangement of the stator coil 4, as shown in FIG. 5, when normal three-phase AC current is supplied to the stator coil 4 via the terminals T1-T3, there will be a phase difference of 30° (i.e., π/6) between each of pairs of drive currents that are respectively supplied to the corresponding pairs of the windings of the first and second winding groups 4a and 4b. The phase difference of π/6 is equal to half the wavelength (i.e., π/3) of the sixth harmonic components of the electromagnetic forces created by the windings of the first and second winding groups 4a and 4b. That is, the sixth harmonic components of the electromagnetic forces created by the windings of the first winding group 4a are in opposite phase to those of the electromagnetic forces created by the windings of the second winding group 4b. Consequently, as shown in FIG. 6, the torque ripple caused by the first winding group 4a will be offset by that caused by the second winding group 4b. As a result, as shown in FIG. 7, the total torque ripple generated in the electric rotating machine 1 can be reduced to about half that of the conventional three-phase electric rotating machine described previously. In addition, though not graphically shown, the total magnetic noise generated in the electric rotating machine 1 can also be considerably reduced in comparison with the conventional three-phase electric rotating machine.

Moreover, unlike the synchronous machine disclosed in Japanese Patent Application Publication No. 2008-5603, the electric rotating machine 1 according to the present embodiment can be driven with only a single three-phase inverter to achieve the above-described effects of reducing the total magnetic noise and torque ripple. Consequently, with the use of the single three-phase inverter, reductions in the scale, cost, and complexity of the entire mechanical power generation system 100 can be achieved.

In addition, with the above arrangement of the stator coil 4, the voltage across each of the Δ-connected windings of the first winding group 4a will be $\sqrt{3}$ times that across each of the Y-connected windings of the second winding group 4b. In consideration of the above, in the present embodiment, the first predetermined number of turns, by which each of the Δ-connected windings of the first winding group 4a is wound, is set to be 1.6 to 1.9 times the second predetermined number of turns by which each of the Y-connected windings of the second winding group 4b is wound. Consequently, the magnitude of the drive current flowing in each of the Δ-connected windings of the first winding group 4a will be substantially equal to that of the drive current flowing in each of the Y-connected windings of the second winding group 4b. As a result, it is possible to more effectively offset the magnetic noise and torque ripple caused by the windings of the first winding group 4a with those caused by the windings of the second winding group 4b.

Second Embodiment

Figure 8:
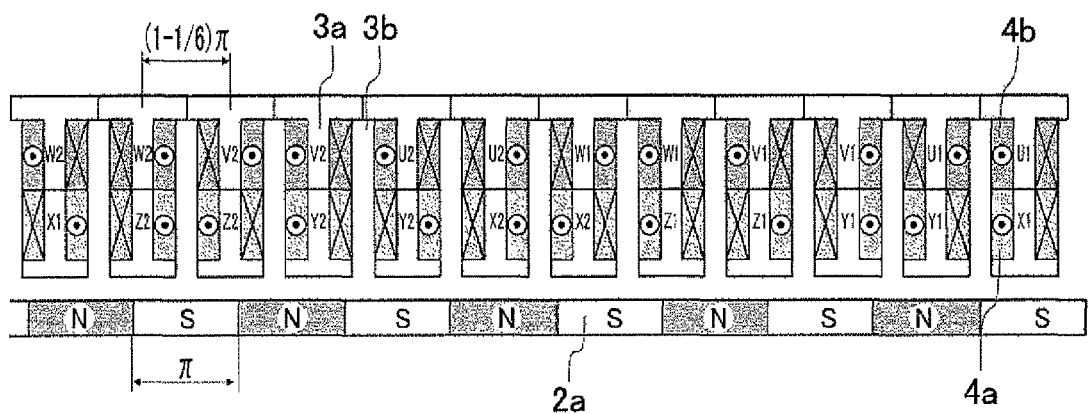
FIG. 8 is a development of an axial cross section of an electric rotating machine according to the second embodiment of the invention.
Figure 9:
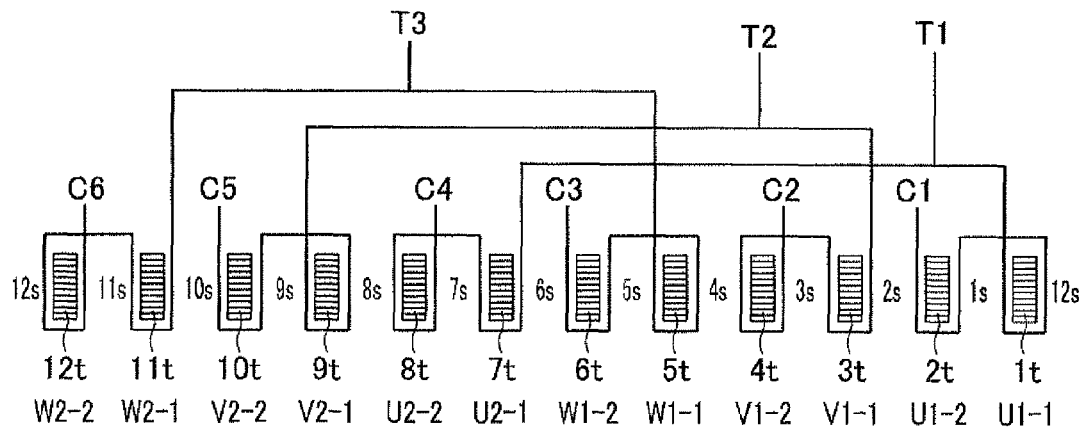
FIG. 9 is a schematic winding connection diagram of the electric rotating machine according to the second embodiment.
Figure 9:
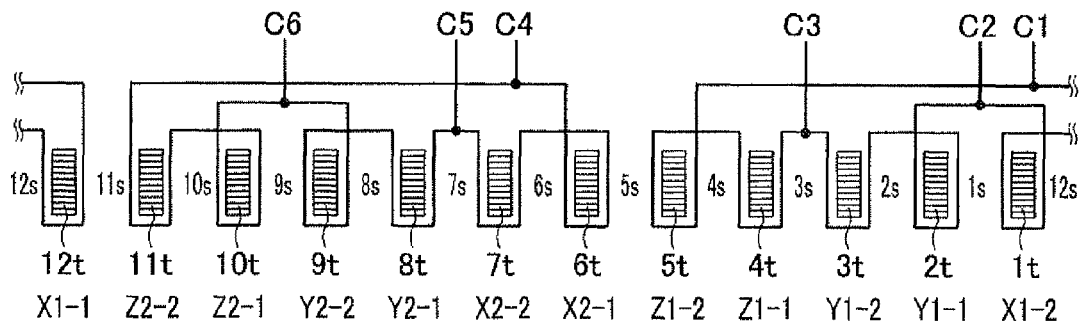

FIGS. 8 and 9 illustrate the configuration of an electric rotating machine 1 according to the second embodiment of the invention. It should be noted that for the sake of facilitating understanding, first and second winding groups 4a and 4b, which are actually mounted on the same stator core 30, are separately shown in FIG. 9.

As shown in FIGS. 8 and 9, the stator core 30 of the stator 3 and the rotor 2 in this embodiment are identical to those in the first embodiment. Accordingly, in this embodiment, the number of the stator core teeth 3a is equal to twelve; the number of the magnetic poles 2a is equal to ten; with respect to the pitch of the magnetic poles 2a in electrical angle being equal to n, the pitch of the stator core teeth 3a in electrical angle is equal to $(1-\frac{1}{6})\pi$.

However, the stator coil 4 is wound around the stator core 30 in a different manner from that in the first embodiment. Specifically, in the present embodiment, the stator coil 4 is wound around the stator core 30 in a concentrated winding manner so that: each of the windings of the first winding group 4a is wound around a radially inner portion of each of corresponding two of the stator core teeth 3a of the stator core by a first predetermined number of turns; and each of the windings of the second winding group 4b is wound around a radially outer portion of each of corresponding two of the stator core teeth 3a of the stator core by a second predetermined number of turns.

More specifically, the first winding group 4a includes first and second X-phase windings X1 and X2, first and second Y-phase windings Y1 and Y2, and first and second Z-phase windings Z1 and Z2.

The first X-phase winding X1 includes a first section X1-1 and a second section X1-2, which are connected in series with each other. The first section X1-1 is wound, from the slot 11s to the slot 12s, clockwise around the stator core tooth 12t by the first predetermined number of turns. The second section X1-2 is wound, from the slot is to the slot 12s, counterclockwise around the stator core tooth 1t by the first predetermined number of turns.

The first Y-phase winding Y1 includes a first section Y1-1 and a second section Y1-2, which are connected in series with each other. The first section Y1-1 is wound, from the slot 2s to the slot is, counterclockwise around the stator core tooth 2t by the first predetermined number of turns. The second section Y1-2 is wound, from the slot 2s to the slot 3s, clockwise around the stator core tooth 3t by the first predetermined number of turns.

The first Z-phase winding Z1 includes a first section 21-1 and a second section 21-2, which are connected in series with each other. The first section 21-1 is wound, from the slot 3s to the slot 4s, clockwise around the stator core tooth 4t by the first predetermined number of turns. The second section Z1-2 is wound, from the slot 5s to the slot 4s, counterclockwise around the stator core tooth 5t by the first predetermined number of turns.

Further, the first X-phase winding X1, the first Y-phase winding Y1, and the first Z-phase winding Z1 are Δ-connected so that: one end of the first X-phase winding X1 which protrudes from the slot 12s is connected, at a node C2, to one end of the first Y-phase winding Y1 which protrudes from the slot 2s; the other end of the first Y-phase winding Y1 which protrudes from the slot is connected, at a node C3, to one end of the first Z-phase winding Z1 which protrudes from the slot 3s; and the other end of the first Z-phase winding Z1 which protrudes from the slot 4s is connected, at a node C1, to the other end of the first X-phase winding X1 which protrudes from the slot 11s.

The second X-phase winding X2 includes a first section X2-1 and a second section X2-2, which are connected in series with each other. The first section X2-1 is wound, from the slot 6s to the slot 5s, counterclockwise around the stator core tooth 6t by the first predetermined number of turns. The second section X2-2 is wound, from the slot 6s to the slot 7s, clockwise around the stator core tooth 7t by the first predetermined number of turns.

The second Y-phase winding Y2 includes a first section Y2-1 and a second section Y2-2, which are connected in series with each other. The first section Y2-1 is wound, from the slot 7s to the slot 8s, clockwise around the stator core tooth 8t by the first predetermined number of turns. The second section Y2-2 is wound, from the slot 9s to the slot 8s, counterclockwise around the stator core tooth 9t by the first predetermined number of turns.

The second Z-phase winding Z2 includes a first section Z2-1 and a second section Z2-2, which are connected in series with each other. The first section Z2-1 is wound, from the slot 10s to the slot 9s, counterclockwise around the stator core tooth lot by the first predetermined number of turns. The second section Z2-2 is wound, from the slot 10s to the slot 11s, clockwise around the stator core tooth 11t by the first predetermined number of turns.

Further, the second X-phase winding X2, the second Y-phase winding Y2, and the second Z-phase winding Z2 are Δ-connected so that: one end of the second X-phase winding X2 which protrudes from the slot 7s is connected, at a node C5, to one end of the second Y-phase winding Y2 which protrudes from the slot 7s; the other end of the second Y-phase winding Y2 which protrudes from the slot 8s is connected, at a node C6, to one end of the second Z-phase winding Z2 which protrudes from the slot 10s; and the other end of the second Z-phase winding Z2 which protrudes from the slot 11s is connected, at a node C4, to the other end of the second X-phase winding X2 which protrudes from the slot 6s.

The second winding group 4b includes first and second U-phase windings U1 and U2, first and second V-phase windings V1 and V2, and first and second W-phase windings W1 and W2.

The first U-phase winding U1 includes a first section U1-1 and a second section U1-2, which are connected in series with each other. The first section U1-1 is wound, from the slot 1s to the slot 12s, counterclockwise around the stator core tooth 1t by the second predetermined number of turns. The second section U1-2 is wound, from the slot 1s to the slot 2s, clockwise around the stator core tooth 2t by the second predetermined number of turns.

The first V-phase winding V1 includes a first section V1-1 and a second section V1-2, which are connected in series with each other. The first section V1-1 is wound, from the slot 2s to the slot 3s, clockwise around the stator core tooth 3t by the second predetermined number of turns. The second section V1-2 is wound, from the slot 4s to the slot 3s, counterclockwise around the stator core tooth 4t by the second predetermined number of turns.

The first W-phase winding W1 includes a first section W1-1 and a second section W1-2, which are connected in series with each other. The first section W1-1 is wound, from the slot 5s to the slot 4s, counterclockwise around the stator core tooth 5t by the second predetermined number of turns. The second section W1-2 is wound, from the slot 5s to the slot 6s, clockwise around the stator core tooth 6t by the second predetermined number of turns.

Further, one end of the first U-phase winding U1 which protrudes from the slot is connected to a first terminal T1 of the stator coil 4, and the other end of the same which protrudes from the slot 2s is connected to the node C1. One end of the first V-phase winding V1 which protrudes from the slot 2s is connected to a second terminal T2 of the stator coil 4, and the other end of the same which protrudes from the slot 3s is connected to the node C2. One end of the first W-phase winding W1 which protrudes from the slot 5s is connected to a third terminal T3 of the stator coil 4, and the other end of the same which protrudes from the slot 6s is connected to the node C3. As a result, the first U-phase winding U1, the first V-phase winding V1, and the first W-phase winding W1 are Y-connected with the neutral point therebetween being made up of the Δ connection of the first X-phase winding X1, the first Y-phase winding Y1, and the first Z-phase winding Z1 (see FIG. 4).

The second U-phase winding U2 includes a first section U2-1 and a second section U2-2, which are connected in series with each other. The first section U2-1 is wound, from the slot 6s to the slot 7s, clockwise around the stator core tooth 7t by the second predetermined number of turns. The second section U2-2 is wound, from the slot 8s to the slot 7s, counterclockwise around the stator core tooth St by the second predetermined number of turns.

The second V-phase winding V2 includes a first section V2-1 and a second section V2-2, which are connected in series with each other. The first section V2-1 is wound, from the slot 9s to the slot 8s, counterclockwise around the stator core tooth 9t by the second predetermined number of turns. The second section V2-2 is wound, from the slot 9s to the slot 10s, clockwise around the stator core tooth 10t by the second predetermined number of turns.

The second W-phase winding W2 includes a first section W2-1 and a second section W2-2, which are connected in series with each other. The first section W2-1 is wound, from the slot 10s to the slot 11s, clockwise around the stator core tooth 11t by the second predetermined number of turns. The second section W2-2 is wound, from the slot 12s to the slot 11s, counterclockwise around the stator core tooth 12t by the second predetermined number of turns.

Further, one end of the second U-phase winding U2 which protrudes from the slot 6s is connected to the first terminal T1 of the stator coil 4, and the other end of the same which protrudes from the slot 7s is connected to the node C4. One end of the second V-phase winding V2 which protrudes from the slot 9s is connected to the second terminal T2 of the stator coil 4, and the other end of the same which protrudes from the slot 10s is connected to the node C5. One end of the second W-phase winding W2 which protrudes from the slot 10s is connected to the third terminal T3 of the stator coil 4, and the other end of the same which protrudes from the slot 11s is connected to the node C6. As a result, the second U-phase winding U2, the second V-phase winding V2, and the second W-phase winding W2 are Y-connected with the neutral point therebetween being made up of the Δ connection of the second X-phase winding X2, the second Y-phase winding Y2, and the second Z-phase winding Z2 (see FIG. 4).

Accordingly, in the present embodiment, the stator coil 4 is comprised of two Δ-Y connections. The first Δ-Y connection is formed by combining the Δ connection of the first X-phase winding X1, the first Y-phase winding Y1, and the first Z-phase winding Z1 with the Y connection of the first U-phase winding U1, the first V-phase winding V1, and the first W-phase winding W1. The second Δ-Y connection is formed by combining the Δ connection of the second X-phase winding X2, the second Y-phase winding Y2, and the second Z-phase winding Z2 with the Y connection of the second U-phase winding U2, the second V-phase winding V2, and the second W-phase winding W2.

Moreover, in the present embodiment, the first predetermined number of turns, by which each of the Δ-connected windings of the first winding group 4a is wound, is also set to be 1.6 to 1.9 times the second predetermined number of turns by which each of the Y-connected windings of the second winding group 4b is wound.

The electric rotating machine 1 according to the present embodiment can be used, instead of the electric rotating machine 1 according to the first embodiment, in the mechanical power generation system 100 shown in FIG. 4 to function as an electric motor. In addition, the electric circuit of the stator 3 according to the present embodiment is the same as that of the stator 3 according to the first embodiment, and thus can also be represented by FIG. 4.

As described above, in the present embodiment, each corresponding pair of the windings of the first and second stator coils 4a and 4b, such as the pairs of the windings X1 and U1, Y1 and V1, Z1 and W1, X2 and U2, Y2 and V2, and Z2 and W2, are offset from each other in the circumferential direction of the stator core 30 by one stator core tooth 3a. Further, the first sections X1-1 and U1-1 of the windings X1 and U1 are respectively wound around the adjacent pair of the stator core teeth 12t and it in opposite directions; the second sections X1-2 and U1-2 of the windings X1 and U1 are respectively wound around the adjacent pair of the stator core teeth 1t and 2t in opposite directions; the first sections Y1-1 and V1-1 of the windings Y1 and V1 are respectively wound around the adjacent pair of the stator core teeth 2t and 3t in opposite directions; the second sections Y1-2 and V1-2 of the windings Y1 and V1 are respectively wound around the adjacent pair of the stator core teeth 3t and 4t in opposite directions; the first sections Z1-1 and W1-1 of the windings Z1 and W1 are respectively wound around the adjacent pair of the stator core teeth 4t and 5t in opposite directions; the second sections Z1-2 and W1-2 of the windings Z1 and W1 are respectively wound around the adjacent pair of the stator core teeth 5t and 6t in opposite directions; the first sections X2-1 and U2-1 of the windings X2 and U2 are respectively wound around the adjacent pair of the stator core teeth 6t and 7t in opposite directions; the second sections X2-2 and U2-2 of the windings X2 and U2 are respectively wound around the adjacent pair of the stator core teeth 7t and 8t in opposite directions; the first sections Y2-1 and V2-1 of the windings Y2 and V2 are respectively wound around the adjacent pair of the stator core teeth 8t and 9t in opposite directions; the second sections Y2-2 and V2-2 of the windings Y2 and V2 are respectively wound around the adjacent pair of the stator core teeth 9t and lot in opposite directions; the first sections Z2-1 and W2-1 of the windings Z2 and W2 are respectively wound around the adjacent pair of the stator core teeth 10t and 11t in opposite directions; the second sections Z2-2 and W2-2 of the windings Z2 and W2 are respectively wound around the adjacent pair of the stator core teeth 11t and 12t in opposite directions. Consequently, the phase difference between each corresponding pair of the windings of the first and second stator coils 4a and 4b becomes equal to: $(1-\frac{1}{6})\pi - \pi = -\pi/6$. As a result, the magnetic noise and torque ripple caused by the windings of the first winding group 4a can be offset by those caused by the windings of the second winding group 4b.

Moreover, the electric rotating machine 1 according to the present embodiment can also be driven with only a single three-phase inverter.

Therefore, with the stator coil arrangement according to the present embodiment, it is possible to achieve the same advantages as with that according to the first embodiment.

Moreover, in the present embodiment, the first and second sections of each of the windings of the first and second winding groups 4a and 4b are respectively wound around an adjacent pair of the stator core teeth 3a and connected in series with each other.

With the above arrangement, it is possible to continuously wind the first and second sections at the same time, thereby improving the productivity of the electric rotating machine 1.

In addition, in the present embodiment, each corresponding pair of the windings of the first and second winding groups 4a and 4b occupies an angular range covering three stator core teeth 3a. Consequently, compared to the first embodiment, the sixth harmonic components of the electromagnetic forces caused by the corresponding pair of the windings can be offset in a wider angular range. As a result, it is possible to more effectively reduce the total magnetic noise and torque ripple generated in the electric rotating machine 1.

Third Embodiment

This embodiment illustrates an electric rotating machine 1 which has a stator coil arrangement slightly different from that according to the first embodiment.

The stator core 30 of the stator 3 and the rotor 2 in this embodiment are identical to those in the first embodiment. Accordingly, in this embodiment, the number of the stator core teeth 3a is equal to twelve; the number of the magnetic poles 2a is equal to ten; with respect to the pitch of the magnetic poles 2a in electrical angle being equal to π, the pitch of the stator core teeth 3a in electrical angle is equal to $(1-\frac{1}{6})\pi$.

Figure 10:
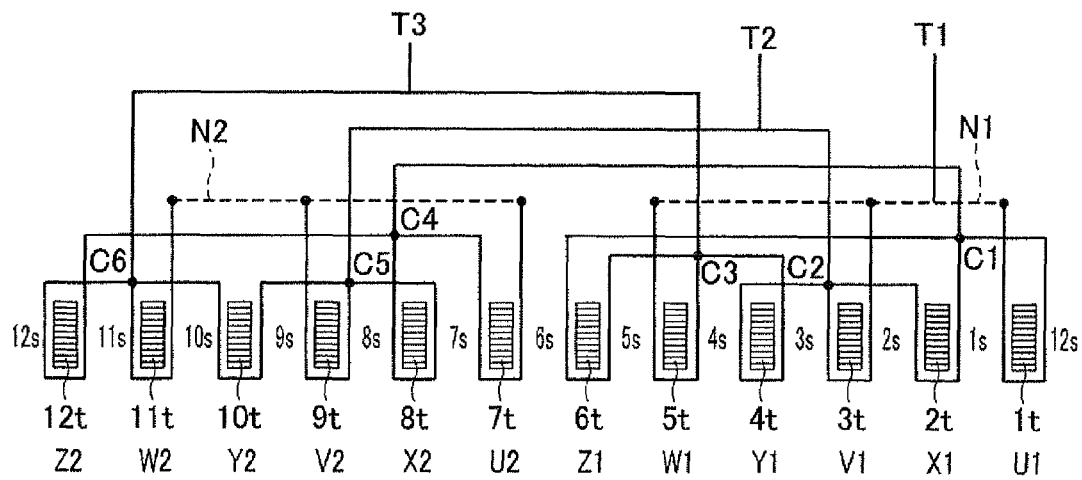
FIG. 10 is a schematic winding connection diagram of an electric rotating machine according to the third embodiment of the invention.

Referring to FIG. 10, in this embodiment, the stator coil 4 is comprised of first and second winding groups 4a and 4b. The first winding group 4a includes first and second X-phase windings X1 and X2, first and second Y-phase windings Y1 and Y2, and first and second Z-phase windings Z1 and Z2. The second winding group 4b includes first and second U-phase windings U1 and U2, first and second V-phase windings V1 and V2, and first and second W-phase windings W1 and W2. The stator coil 4 is wound around the stator core 30 in a concentrated winding manner so that each of the windings of the first and second winding groups 4a and 4b is wound around a corresponding one of the stator core teeth 3a of the stator core 30.

Specifically, the windings of the first winding group 4a are wound as follows.

The first X-phase winding X1 is wound, from the slot is to the slot 2s, clockwise around the stator core tooth 2t by a first predetermined number of turns. The first Y-phase winding Y1 is wound, from the slot 4s to the slot 3s, counterclockwise around the stator core tooth 4t by the first predetermined number of turns. The first Z-phase winding Z1 is wound, from the slot 5s to the slot 6s, clockwise around the stator core tooth 6t by the first predetermined number of turns. Further, the first X-phase winding X1, the first Y-phase winding Y1, and the first Z-phase winding Z1 are Δ-connected so that: the first X-phase winding X1 and the first Y-phase winding Y1 are connected at a node C2; the first Y-phase winding Y1 and the first Z-phase winding Z1 are connected at a node C3; and the first Z-phase winding Z1 and the first X-phase winding X1 are connected at a node C1.

Moreover, the second X-phase winding X2 is wound, from the slot 8s to the slot 7s, counterclockwise around the stator core tooth 8t by the first predetermined number of turns. The second Y-phase winding Y2 is wound, from the slot 9s to the slot 10s, clockwise around the stator core tooth 10t by the first predetermined number of turns. The second Z-phase winding Z2 is wound, from the slot 12s to the slot 11s, counterclockwise around the stator core tooth 12t by the first predetermined number of turns. Further, the second X-phase winding X2, the second Y-phase winding Y2, and the second Z-phase winding Z2 are Δ-connected so that: the second X-phase winding X2 and the second Y-phase winding Y2 are connected at a node C5; the second Y-phase winding Y2 and the second Z-phase winding Z2 are connected at a node C6; and the second Z-phase winding Z2 and the second X-phase winding X2 are connected at a node C4.

On the other hand, the windings of the second winding group 4b are wound as follows.

The first U-phase winding U1 is wound, from the slot 1s to the slot 12s, counterclockwise around the stator core tooth 1t by a second predetermined number of turns. Further, the first U-phase winding U1 has one end protruding from the slot 1s and connected to a neutral point N1, and the other end protruding from the slot 12s and connected to the node C1. The first V-phase winding V1 is wound, from the slot 2s to the slot 3s, clockwise around the stator core tooth 3t by the second predetermined number of turns. Further, the first V-phase winding V1 has one end protruding from the slot 2s and connected to the neutral point N1, and the other end protruding from the slot 3s and connected to the node C2. The first W-phase winding W1 is wound, from the slot 5s to the slot 4s, counterclockwise around the stator core tooth 5t by the second predetermined number of turns. Further, the first W-phase winding W1 has one end protruding from the slot 5s and connected to the neutral point N1, and the other end protruding from the slot 4s and connected to the node C3. As a result, the first U-phase winding U1, the first V-phase winding V1, and the first W-phase winding W1 of the second winding group 4b are Y-connected with the three ends of the Y-connection respectively connected to the nodes C1-C3 between the Δ-connected windings X1, Y1, and Z1 of the first winding group 4a (see FIG. 11).

Moreover, the second U-phase winding U2 is wound, from the slot 6s to the slot 7s, clockwise around the stator core tooth 7t by the second predetermined number of turns. Further, the second U-phase winding U2 has one end protruding from the slot 6s and connected to a neutral point N2, and the other end protruding from the slot 7s and connected to the node C4. The second V-phase winding V2 is wound, from the slot 9s to the slot 8s, counterclockwise around the stator core tooth 9t by the second predetermined number of turns. Further, the second V-phase winding V2 has one end protruding from the slot 9s and connected to the neutral point N2, and the other end protruding from the slot 8s and connected to the node C5. The second W-phase winding W2 is wound, from the slot 10s to the slot 11s, clockwise around the stator core tooth 1 it by the second predetermined number of turns. Further, the second W-phase winding W2 has one end protruding from the slot 10s and connected to the neutral point N2, and the other end protruding from the slot 11s and connected to the node C6. As a result, the second U-phase winding U2, the second V-phase winding V2, and the second W-phase winding W2 of the second winding group 4b are Y-connected with the three ends of the Y-connection respectively connected to the nodes C4-C6 between the Δ-connected windings X2, Y2, and Z2 of the first winding group 4a (see FIG. 11).

Furthermore, both the nodes C1 and C4 are connected to a first terminal T1 of the stator coil 4; both the nodes C2 and C5 are connected to a second terminal T2 of the stator coil 4; both the nodes C3 and C6 are connected to a third terminal T3 of the stator coil 4.

Accordingly, in the present embodiment, the stator coil 4 is comprised of two Δ-Y connections. The first Δ-Y connection is formed by combining the Δ connection of the first X-phase winding X1, the first Y-phase winding Y1, and the first Z-phase winding Z1 with the Y connection of the first U-phase winding U1, the first V-phase winding V1, and the first W-phase winding W1. The second Δ-Y connection is formed by combining the Δ connection of the second X-phase winding X2, the second Y-phase winding Y2, and the second Z-phase winding Z2 with the Y connection of the second U-phase winding U2, the second V-phase winding V2, and the second W-phase winding W2.

Moreover, in the present embodiment, the first predetermined number of turns, by which each of the Δ-connected windings of the first winding group 4a is wound, is also set to be 1.6 to 1.9 times the second predetermined number of turns by which each of the Y-connected windings of the second winding group 4b is wound.

Figure 11:
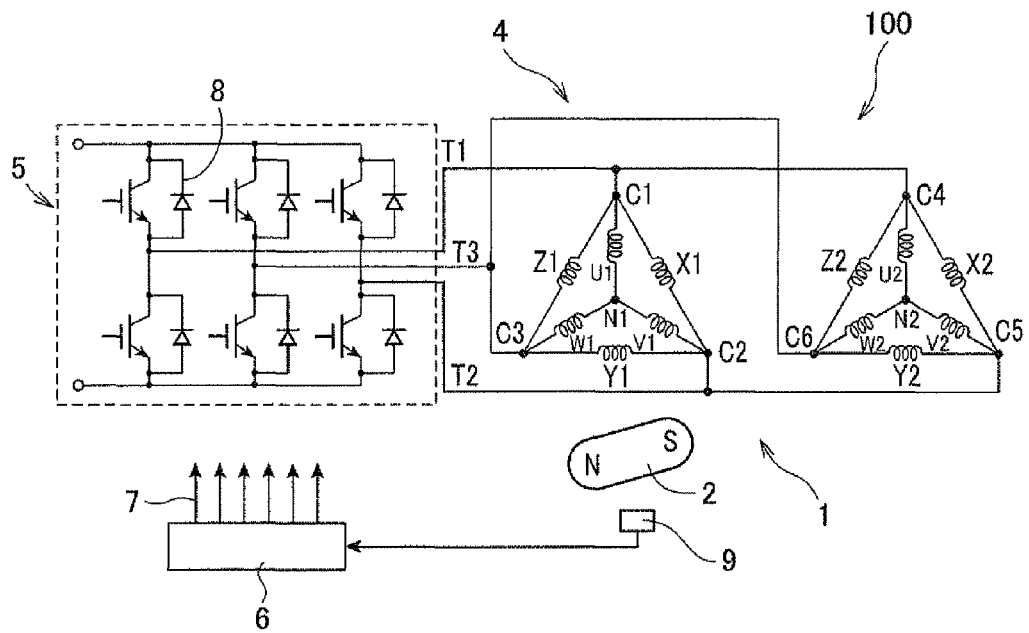
FIG. 11 is a schematic view illustrating the overall configuration of a mechanical power generation system which includes the electric rotating machine according to the third embodiment.

As shown in FIG. 11, the electric rotating machine 1 according to the present embodiment can be used, instead of the electric rotating machine 1 according to the first embodiment, in the mechanical power generation system 100 to function as an electric motor. In addition, it can be seen from FIG. 11 and FIG. 4 that the electric circuit of the stator 3 according to the present embodiment is different from that of the stator 3 according to the first embodiment.

With the stator coil arrangement according to the present embodiment, it is possible to achieve the same advantages as with that according to the first embodiment.

Fourth Embodiment

This embodiment illustrates an electric rotating machine 1 which has a stator coil arrangement that is a combination of the stator coil arrangements according to the second and third embodiments.

The stator core 30 of the stator 3 and the rotor 2 in this embodiment are identical to those in the previous embodiments. Accordingly, in this embodiment, the number of the stator core teeth 3a is equal to twelve; the number of the magnetic poles 2a is equal to ten; with respect to the pitch of the magnetic poles 2a in electrical angle being equal to $\pi$, the pitch of the stator core teeth 3a in electrical angle is equal to $(1-\frac{1}{6})\pi$.

Figure 12:
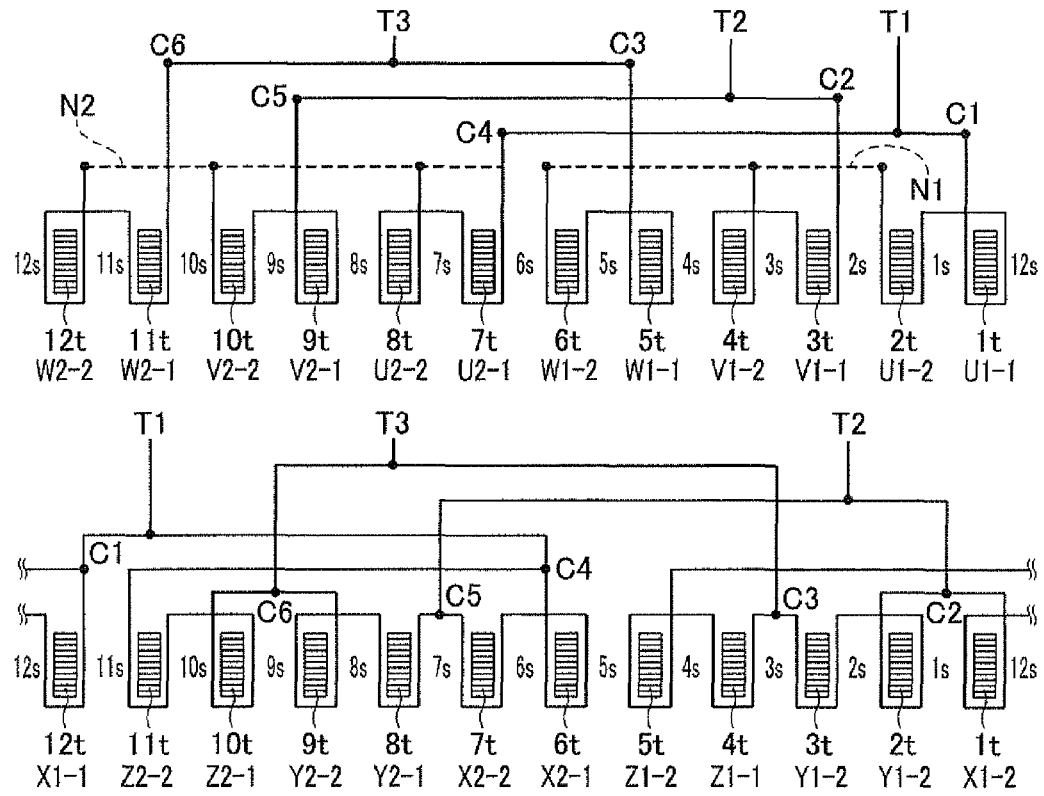
FIG. 12 is a schematic winding connection diagram of an electric rotating machine according to the fourth embodiment of the invention.

Referring to FIG. 12, in the present embodiment, the stator coil 4 is comprised of first and second winding groups 4a and 4b. The first winding group 4a includes first and second X-phase windings X1 and X2, first and second Y-phase windings Y1 and Y2, and first and second Z-phase windings Z1 and Z2. The second winding group 4b includes first and second U-phase windings U1 and U2, first and second V-phase windings V1 and V2, and first and second W-phase windings W1 and W2. The stator coil 4 is wound around the stator core 30 in a concentrated winding manner so that: each of the windings of the first winding group 4a is wound around a radially inner portion of each of corresponding two of the stator core teeth 3a of the stator core by a first predetermined number of turns; and each of the windings of the second winding group 4b is wound around a radially outer portion of each of corresponding two of the stator core teeth 3a of the stator core by a second predetermined number of turns.

Specifically, the windings of the first winding group 4a are wound as follows.

The first X-phase winding X1 includes a first section X1-1 and a second section X1-2, which are connected in series with each other. The first section X1-1 is wound, from the slot 11s to the slot 12s, clockwise around the stator core tooth 12t by the first predetermined number of turns. The second section X1-2 is wound, from the slot 1s to the slot 12s, counterclockwise around the stator core tooth it by the first predetermined number of turns.

The first Y-phase winding Y1 includes a first section Y1-1 and a second section Y1-2, which are connected in series with each other. The first section Y1-1 is wound, from the slot 2s to the slot 1s, counterclockwise around the stator core tooth 2t by the first predetermined number of turns. The second section Y1-2 is wound, from the slot 2s to the slot 3s, clockwise around the stator core tooth 3t by the first predetermined number of turns.

The first Z-phase winding 21 includes a first section Z1-1 and a second section Z1-2, which are connected in series with each other. The first section Z1-1 is wound, from the slot 3s to the slot 4s, clockwise around the stator core tooth 4t by the first predetermined number of turns. The second section Z1-2 is wound, from the slot 5s to the slot 4s, counterclockwise around the stator core tooth 5t by the first predetermined number of turns.

Further, the first X-phase winding X1, the first Y-phase winding Y1, and the first Z-phase winding Z1 are Δ-connected so that: one end of the first X-phase winding X1 which protrudes from the slot 12s is connected, at a node C2, to one end of the first Y-phase winding Y1 which protrudes from the slot 2s; the other end of the first Y-phase winding Y1 which protrudes from the slot is connected, at a node C3, to one end of the first Z-phase winding Z1 which protrudes from the slot 3s; and the other end of the first Z-phase winding Z1 which protrudes from the slot 4s is connected, at a node C1, to the other end of the first X-phase winding X1 which protrudes from the slot 11s.

The second X-phase winding X2 includes a first section X2-1 and a second section X2-2, which are connected in series with each other. The first section X2-1 is wound, from the slot 6s to the slot 5s, counterclockwise around the stator core tooth 6t by the first predetermined number of turns. The second section X2-2 is wound, from the slot 6s to the slot 7s, clockwise around the stator core tooth 7t by the first predetermined number of turns.

The second Y-phase winding Y2 includes a first section Y2-1 and a second section Y2-2, which are connected in series with each other. The first section Y2-1 is wound, from the slot 7s to the slot 8s, clockwise around the stator core tooth 8t by the first predetermined number of turns. The second section Y2-2 is wound, from the slot 9s to the slot 8s, counterclockwise around the stator core tooth 9t by the first predetermined number of turns.

The second Z-phase winding Z2 includes a first section Z2-1 and a second section Z2-2, which are connected in series with each other. The first section Z2-1 is wound, from the slot 10s to the slot 9s, counterclockwise around the stator core tooth lot by the first predetermined number of turns. The second section Z2-2 is wound, from the slot 10s to the slot 11s, clockwise around the stator core tooth 11t by the first predetermined number of turns.

Further, the second X-phase winding X2, the second Y-phase winding Y2, and the second Z-phase winding Z2 are Δ-connected so that: one end of the second X-phase winding X2 which protrudes from the slot 7s is connected, at a node C5, to one end of the second Y-phase winding Y2 which protrudes from the slot 7s; the other end of the second Y-phase winding Y2 which protrudes from the slot 8s is connected, at a node C6, to one end of the second Z-phase winding Z2 which protrudes from the slot 10s; and the other end of the second Z-phase winding Z2 which protrudes from the slot 11s is connected, at a node C4, to the other end of the second X-phase winding X2 which protrudes from the slot 6s.

On the other hand, the windings of the second winding group 4b are wound as follows.

The first U-phase winding U1 includes a first section U1-1 and a second section U1-2, which are connected in series with each other. The first section U1-1 is wound, from the slot is to the slot 12s, counterclockwise around the stator core tooth it by the second predetermined number of turns. The second section U1-2 is wound, from the slot 1s to the slot 2s, clockwise around the stator core tooth 2t by the second predetermined number of turns.

The first V-phase winding V1 includes a first section V1-1 and a second section V1-2, which are connected in series with each other. The first section V1-1 is wound, from the slot 2s to the slot 3s, clockwise around the stator core tooth 3t by the second predetermined number of turns. The second section V1-2 is wound, from the slot 4s to the slot 3s, counterclockwise around the stator core tooth 4t by the second predetermined number of turns.

The first W-phase winding W1 includes a first section W1-1 and a second section W1-2, which are connected in series with each other. The first section W1-1 is wound, from the slot 5s to the slot 4s, counterclockwise around the stator core tooth 5t by the second predetermined number of turns. The second section W1-2 is wound, from the slot 5s to the slot 6s, clockwise around the stator core tooth 6t by the second predetermined number of turns.

Further, one end of the first U-phase winding U1 which protrudes from the slot 1s is connected to the node C1, and the other end of the same which protrudes from the slot 2s is connected to a neutral point N1. One end of the first V-phase winding V1 which protrudes from the slot 2s is connected to the node C2, and the other end of the same which protrudes from the slot 3s is connected to the neutral point N1. One end of the first W-phase winding W1 which protrudes from the slot 5s is connected to the node C3, and the other end of the same which protrudes from the slot 6s is connected to t the neutral point N1. As a result, the first U-phase winding U1, the first V-phase winding V1, and the first W-phase winding W1 of the second winding group 4b are Y-connected with the three ends of the Y-connection respectively connected to the nodes C1-C3 between the Δ-connected windings X1, Y1, and Z1 of the first winding group 4a (see FIG. 11).

The second U-phase winding U2 includes a first section U2-1 and a second section U2-2, which are connected in series with each other. The first section U2-1 is wound, from the slot 6s to the slot 7s, clockwise around the stator core tooth 7t by the second predetermined number of turns. The second section U2-2 is wound, from the slot 8s to the slot 7s, counterclockwise around the stator core tooth 8t by the second predetermined number of turns.

The second V-phase winding V2 includes a first section V2-1 and a second section V2-2, which are connected in series with each other. The first section V2-1 is wound, from the slot 9s to the slot 8s, counterclockwise around the stator core tooth 9t by the second predetermined number of turns. The second section V2-2 is wound, from the slot 9s to the slot 10s, clockwise around the stator core tooth 10t by the second predetermined number of turns.

The second W-phase winding W2 includes a first section W2-1 and a second section W2-2, which are connected in series with each other. The first section W2-1 is wound, from the slot 10s to the slot 11s, clockwise around the stator core tooth 11t by the second predetermined number of turns. The second section W2-2 is wound, from the slot 12s to the slot 11s, counterclockwise around the stator core tooth 12t by the second predetermined number of turns.

Further, one end of the second U-phase winding U2 which protrudes from the slot 6s is connected to the node C4, and the other end of the same which protrudes from the slot 7s is connected to a neutral point N2. One end of the second V-phase winding V2 which protrudes from the slot 9s is connected to the node C5, and the other end of the same which protrudes from the slot 10s is connected to the neutral point N2. One end of the second W-phase winding W2 which protrudes from the slot 10s is connected to the node C6, and the other end of the same which protrudes from the slot 11s is connected to the neutral point N2. As a result, the second U-phase winding U2, the second V-phase winding V2, and the second W-phase winding W2 of the second winding group 4b are Y-connected with the three ends of the Y-connection respectively connected to the nodes C4-C6 between the Δ-connected windings X2, Y2, and Z2 of the first winding group 4a (see FIG. 11).

Furthermore, both the nodes C1 and C4 are connected to a first terminal T1 of the stator coil 4; both the nodes C2 and C5 are connected to a second terminal T2 of the stator coil 4; both the nodes C3 and C6 are connected to a third terminal T3 of the stator coil 4.

Accordingly, in the present embodiment, the stator coil 4 is comprised of two Δ-Y connections. The first Δ-Y connection is formed by combining the Δ connection of the first X-phase winding X1, the first Y-phase winding Y1, and the first Z-phase winding Z1 with the Y connection of the first U-phase winding U1, the first V-phase winding V1, and the first W-phase winding W1. The second Δ-Y connection is formed by combining the Δ connection of the second X-phase winding X2, the second Y-phase winding Y2, and the second Z-phase winding Z2 with the Y connection of the second U-phase winding U2, the second V-phase winding V2, and the second W-phase winding W2.

Moreover, in the present embodiment, the first predetermined number of turns, by which each of the Δ-connected windings of the first winding group 4a is wound, is also set to be 1.6 to 1.9 times the second predetermined number of turns by which each of the Y-connected windings of the second winding group 4b is wound.

The electric rotating machine 1 according to the present embodiment can be used, instead of the electric rotating machine 1 according to the third embodiment, in the mechanical power generation system 100 shown in FIG. 11 to function as an electric motor. In addition, the electric circuit of the stator 3 according to the present embodiment is the same as that of the stator 3 according to the third embodiment, and thus can also be represented by FIG. 11.

With the stator coil arrangement according to the present embodiment, it is possible to achieve the same advantages as with that according to the second embodiment.

While the above particular embodiments of the present invention have been shown and described, it will be understood by those skilled in the art that various modifications, changes, and improvements may be made without departing from the spirit of the invention.

Figure 13:
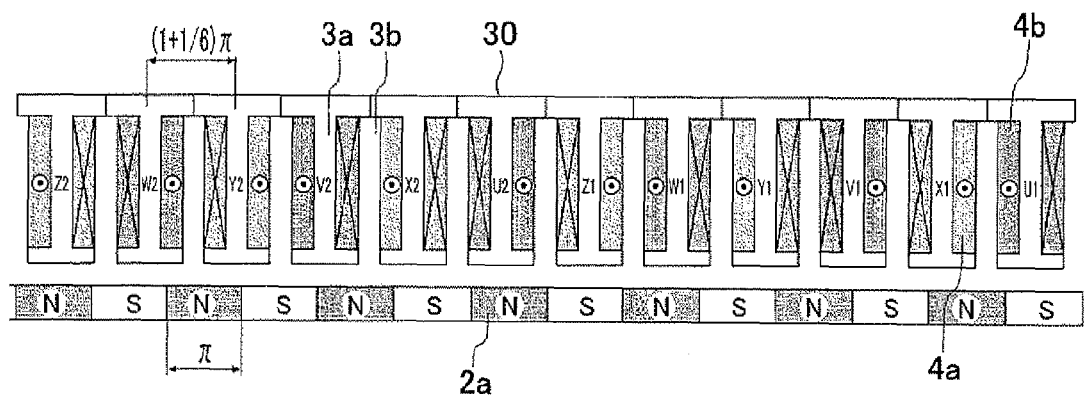
FIG. 13 is a development of an axial cross section of an electric rotating machine according to a modification of the invention.
Figure 14:
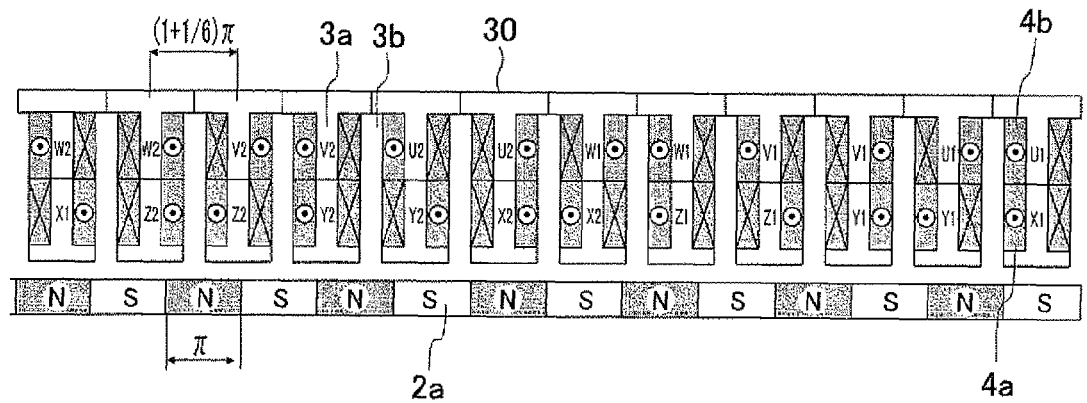
FIG. 14 is a development of an axial cross section of an electric rotating machine according to another modification of the invention.

For example, in the previous embodiments, the rotor 2 has ten magnetic poles 2a. However, as shown in FIGS. 13 and 14, the rotor 2 may also have fourteen magnetic poles 2a the polarities of which alternate between north and south in the circumferential direction of the stator core 30. In this case, the ratio of the number of the stator core teeth 3a to the number of the magnetic poles 2a is equal to 6:7. Therefore, with respect to the pitch of the magnetic poles 2a in electrical angle being equal to n, the pitch of the stator core teeth 3a in electrical angle is equal to $(1+1/6)\pi$. Further, the winding directions of each corresponding pair of one of the windings of the first winding group 4a and one of the windings of the second winding group 4b, which are respectively wound around an adjacent pair of the stator core teeth 3a, are opposite to each other. Consequently, the phase difference between each corresponding pair of the windings of the first and second winding groups 4a and 4b becomes equal to: $(1+1/6)\pi-\pi=\pi/6$. As a result, with the number of the magnetic poles 2a being equal to fourteen, it is still possible to achieve the advantages described in the previous embodiments.

Figure 15:
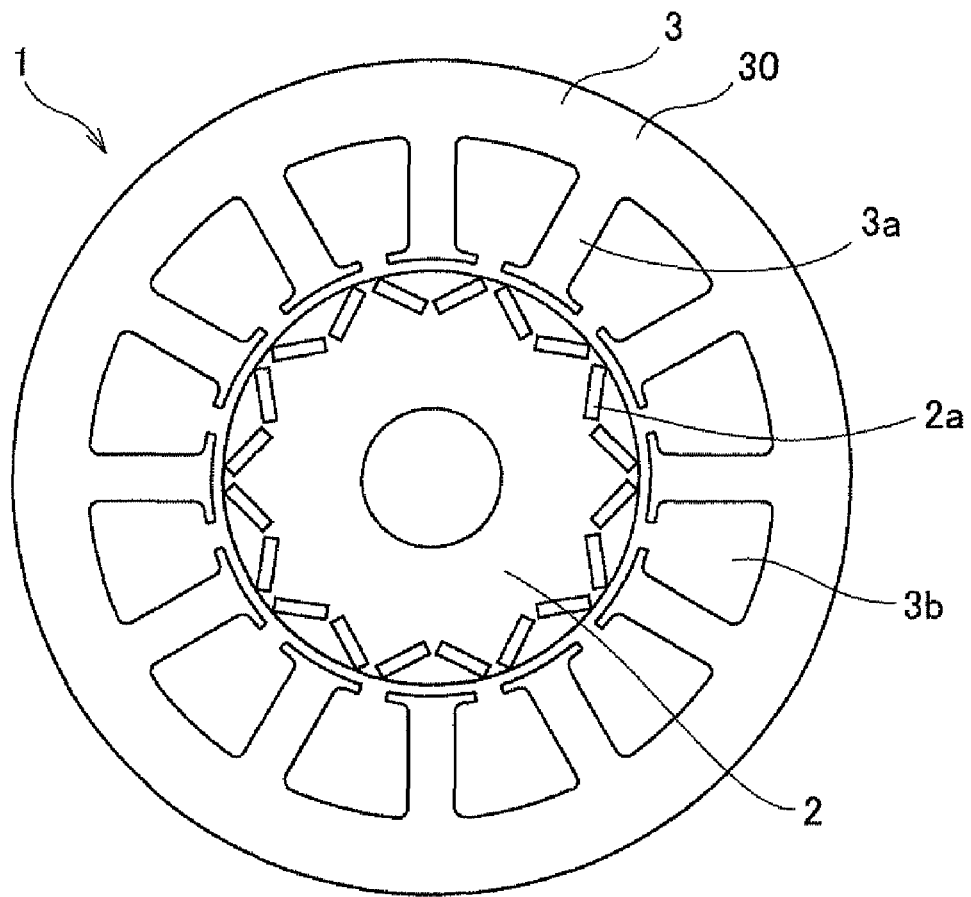
FIG. 15 is a schematic view illustrating the overall configuration of an electric rotating machine according to yet another modification of the invention.

In the previous embodiments, the magnetic poles 2a of the rotor 2 are formed by arranging the permanent magnets on the radially outer periphery of the rotor 2. However, as shown in FIG. 15, the magnetic poles 2a of the rotor 2 may also be formed by embedding the permanent magnets in the rotor 2. In other words, the rotor 2 may also be of an IPM (Interior Permanent Magnet) type. In this case, it is possible to further reduce the magnetic noise and torque ripple generated in the electric rotating machine 1.

Moreover, the magnetic poles 2a of the rotor 2 may also be formed by creating desired magnetic reluctance in the rotor 2 or by using electromagnets. In other words, the rotor 2 may also be of reluctance type or electromagnet type.

In the previous embodiments and modifications, the number of the stator core teeth 3a is equal to twelve, while the number of the magnetic poles 2a is equal to 10 or 14. In other words, the number of the stator core teeth 3a is equal to 12×1 with the number of the magnetic poles 2a being equal to 10×1 or 14×1. However, the number of the stator core teeth 3a may also be equal to 12×n with the number of the magnetic poles 2a being equal to 10×n or 14×n, where n is a natural number greater than 1. In this case, the first winding group 4a may include 2×n X-phase windings, 2×n Y-phase windings, and 2×n Z-phase windings; the second winding group 4b may include 2×n U-phase windings, 2×n V-phase windings, and 2×n W-phase windings; the windings of the first and second winding groups 4a and 4b may be connected to form 2×n Δ-Y connections that are arranged one after another in the circumferential direction of the stator core 30.

In the previous embodiments, each of the Δ-Y connections is formed by: Δ-connecting three different-phase windings of the first winding group 4a to form a Δ connection; and Y-connecting three different-phase windings of the second winding group 4b to form a Y connection. However, at least one of the Δ-Y connections may also be formed by: Δ-connecting three different-phase windings of the second winding group 4b to form a Δ connection; and Y-connecting three different-phase windings of the first winding group 4a to form a Y connection.

In the first and third embodiments, for each of the windings of the first and second winding groups 4a and 4b, the first and second sections of the winding are connected in series with each other. However, the first and second sections may also be connected in parallel with each other. In addition, in this case, it is preferable to halve the cross-sectional area of the winding and double the number of turns of the same around the corresponding stator core teeth 3a.

In the second and fourth embodiments, the Δ-connected windings of the first winding group 4a are positioned radially inward of the Y-connected windings of the second winding group 4b. Moreover, the circumferential width of each of the slots 3b of the stator core 30 increases in a radially outward direction (see FIG. 1). Therefore, it is preferable that the Δ-connected windings of the first winding group 4a have a smaller thickness than the Y-connected windings of the second winding group 4b, thereby improving the space factors of the windings of the first and second winding groups 4a and 4b in the slots 3b of the stator core 30.

Figure 16:
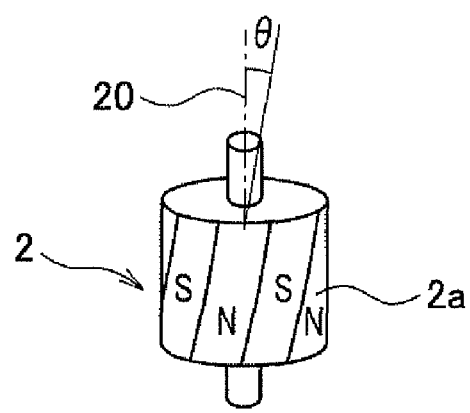
FIG. 16 is a schematic perspective view of a rotor of an electric rotating machine according to still another modification of the invention.

In the previous embodiments, the magnetic poles 2a of the rotor 2 may be skewed with respect to the longitudinal axis 20 of the rotor 2 by a predetermined angle θ, as shown in FIG. 16. In this case, it is possible to further effectively reduce the total magnetic noise and torque ripple generated in the electric rotating machine 1 at high rotational speeds of the rotor 2. In addition, the predetermined angle θ may be, for example, 45°.

In the previous embodiments, the electric rotating machine 1 is used in the mechanical power generation system 100 to function as an electric motor. However, the electric rotating machine 1 may also be used in an electric power generation system to function as an electric generator. In this case, the electric power generation system may employ only a single three-phase rectifier to rectify three-phase AC current, which is output from the stator coil 4 of the electric rotating machine 1, into DC power. Consequently, with the use of the single three-phase rectifier, reductions in the scale, cost, and complexity of the entire electric power generation system can be achieved.

What is claimed is:

1. An electric rotating machine comprising:
   a stator including a hollow cylindrical stator core and a stator coil, the stator core having a plurality of stator core teeth that are formed at a predetermined pitch in a circumferential direction of the stator core, the stator coil having three terminals via which three-phase AC current is input to or output from the stator coil; and
   a rotor disposed radially inside of the stator core, the rotor having a plurality of magnetic poles the polarities of which alternate between north and south in the circumferential direction of the stator core,
   wherein
   the number of the stator core teeth is equal to 12×n, and the number of the magnetic poles of the rotor is equal to 10×n or 14×n, where n is a natural number,
   the stator coil is comprised of first and second winding groups, the first winding group including 2×n X-phase windings, 2×n Y-phase windings, and 2×n Z-phase windings, the second winding group including 2×n U-phase windings, 2×n V-phase windings, and 2×n W-phase windings,
   the stator coil is wound around the stator core in a concentrated winding manner so that each of the windings of the first and second winding groups is wound around a corresponding one of the stator core teeth,
   the windings of the first and second winding groups are connected to form 2×n Δ-Y connections that are arranged one after another in the circumferential direction of the stator core,
   each of the Δ-Y connections is formed of six different-phase windings including one X-phase winding, one Y-phase winding, and one Z-phase winding of the first winding group and one U-phase winding, one V-phase winding, and one W-phase winding of the second winding group, the six different-phase windings being adjacent to one another and arranged in a phase sequence of U, X, V, Y, W, and Z in the circumferential direction of the stator core,
   for each of the Δ-Y connections, the U-phase and X-phase windings are wound in opposite directions, the V-phase and Y-phase windings are wound in opposite directions, and the W-phase and Z-phase windings are wound in opposite directions, and
   each of the Δ-Y connections is a combination of a Δ connection and a Y connection, the Δ connection being formed by Δ-connecting the three different-phase windings of one of the first and second winding groups, the Y connection being formed by Y-connecting the three different-phase windings of the other winding group, the Δ and Y connections being combined by connecting opposite ends of each of the Y-connected windings respectively to a corresponding one of nodes between the Δ-connected windings and a corresponding one of the three terminals of the stator coil.

2. The electric rotating machine as set forth in claim 1, wherein each of the Δ-connected windings is wound around the corresponding stator core tooth by a first predetermined number of turns,
   each of the Y-connected windings is wound around the corresponding stator core tooth by a second predetermined number of turns, and
   the first predetermined number is set to be 1.6 to 1.9 times the second predetermined number.

3. The electric rotating machine as set forth in claim 1, wherein the magnetic poles of the rotor are skewed with respect to a longitudinal axis of the rotor by a predetermined angle.

4. The electric rotating machine as set forth in claim 1, wherein the electric rotating machine is used in a mechanical power generation system to function as an electric motor, and
   the mechanical power generation system comprises only a single three-phase inverter to supply three-phase AC current to the stator coil of the electric rotating machine via the three terminals of the stator coil.

5. The electric rotating machine as set forth in claim 1, wherein the electric rotating machine is used in an electric power generation system to function as an electric generator, and
   the electric power generation system comprises only a single three-phase rectifier to rectify three-phase AC current, which is output from the stator coil of the electric rotating machine via the three terminals of the stator coil, into DC current.

6. An electric rotating machine comprising:
a stator including a hollow cylindrical stator core and a stator coil, the stator core having a plurality of stator core teeth that are formed at a predetermined pitch in a circumferential direction of the stator core, the stator coil having three terminals via which three-phase AC current is input to or output from the stator coil; and
a rotor disposed radially inside of the stator core, the rotor having a plurality of magnetic poles the polarities of which alternate between north and south in the circumferential direction of the stator core,
wherein
the number of the stator core teeth is equal to 12×n, and the number of the magnetic poles of the rotor is equal to 10×n or 14×n, where n is a natural number,
the stator coil is comprised of first and second winding groups, the first winding group including 2×n X-phase windings, 2×n Y-phase windings, and 2×n Z-phase windings, the second winding group including 2×n U-phase windings, 2×n V-phase windings, and 2×n W-phase windings,
the stator coil is wound around the stator core in a concentrated winding manner so that each of the windings of the first and second winding groups is wound around a corresponding one of the stator core teeth,
the windings of the first and second winding groups are connected to form 2×n Δ-Y connections that are arranged one after another in the circumferential direction of the stator core,
each of the Δ-Y connections is formed of six different-phase windings including one X-phase winding, one Y-phase winding, and one Z-phase winding of the first winding group and one U-phase winding, one V-phase winding, and one W-phase winding of the second winding group, the six different-phase windings being adjacent to one another and arranged in a phase sequence of U, X, V, Y, W, and Z in the circumferential direction of the stator core,
for each of the Δ-Y connections, the U-phase and X-phase windings are wound in opposite directions, the V-phase and Y-phase windings are wound in opposite directions, and the W-phase and Z-phase windings are wound in opposite directions, and each of the Δ-Y connections is a combination of a Δ connection and a Y connection, the Δ connection being formed by Δ-connecting the three different-phase windings of one of the first and second winding groups, nodes between the Δ-connected windings being respectively connected to the three terminals of the stator coil, the Y connection being formed by Y-connecting the three different-phase windings of the other winding group to define a neutral point therebetween, the Δ and Y connections being combined by connecting ends of the Y-connected windings opposite to the neutral point respectively to the nodes between the Δ-connected windings.

7. The electric rotating machine as set forth in claim 6, wherein each of the Δ-connected windings is wound around the corresponding stator core tooth by a first predetermined number of turns,
each of the Y-connected windings is wound around the corresponding stator core tooth by a second predetermined number of turns, and
the first predetermined number is set to be 1.6 to 1.9 times the second predetermined number.

8. The electric rotating machine as set forth in claim 6, wherein the magnetic poles of the rotor are skewed with respect to a longitudinal axis of the rotor by a predetermined angle.

9. The electric rotating machine as set forth in claim 6, wherein the electric rotating machine is used in a mechanical power generation system to function as an electric motor, and
the mechanical power generation system comprises only a single three-phase inverter to supply three-phase AC current to the stator coil of the electric rotating machine via the three terminals of the stator coil.

10. The electric rotating machine as set forth in claim 6, wherein the electric rotating machine is used in an electric power generation system to function as an electric generator, and
the electric power generation system comprises only a single three-phase rectifier to rectify three-phase AC current, which is output from the stator coil of the electric rotating machine via the three terminals of the stator coil, into DC current.

* * * * *